United States Patent
Deckman et al.

(10) Patent No.: US 9,168,485 B2
(45) Date of Patent: *Oct. 27, 2015

(54) METHODS OF REMOVING CONTAMINANTS FROM A HYDROCARBON STREAM BY SWING ADSORPTION AND RELATED APPARATUS AND SYSTEMS

(75) Inventors: Harry W. Deckman, Clinton, NJ (US); Robert A. Johnson, Yardley, PA (US); Robert F. Tammera, Warrenton, VA (US); Thomas N. Anderson, Mobile, AL (US)

(73) Assignee: ExxonMobil Upstream Research Company, Houston, TX (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/985,537

(22) PCT Filed: Feb. 27, 2012

(86) PCT No.: PCT/US2012/026804
§ 371 (c)(1),
(2), (4) Date: Aug. 14, 2013

(87) PCT Pub. No.: WO2012/161826
PCT Pub. Date: Nov. 29, 2012

(65) Prior Publication Data
US 2013/0327216 A1    Dec. 12, 2013

Related U.S. Application Data

(60) Provisional application No. 61/448,121, filed on Mar. 1, 2011, provisional application No. 61/594,824, filed on Feb. 3, 2012.

(51) Int. Cl.
*B01D 53/047* (2006.01)
*B01D 53/053* (2006.01)

(52) U.S. Cl.
CPC ......... *B01D 53/047* (2013.01); *B01D 53/0473* (2013.01); *B01D 53/053* (2013.01);
(Continued)

(58) Field of Classification Search
CPC ............. B01D 53/047; B01D 53/0473; B01D 53/053; B01D 2253/108; B01D 2257/304; B01D 2257/502; B01D 2259/40018; B01D 2259/40033; B01D 2259/40041; B01D 2259/40075; B01D 2259/4068; Y02C 10/08
USPC ................................. 95/96, 136, 139; 96/121
See application file for complete search history.

(56) References Cited

U.S. PATENT DOCUMENTS

| 1,868,138 A | 7/1932 | Fisk |
| 3,124,152 A | 3/1964 | Payne |

(Continued)

FOREIGN PATENT DOCUMENTS

| CA | 2 234 924 | 4/1998 |
| CA | 2 224 471 | 6/1998 |

(Continued)

OTHER PUBLICATIONS (2008), "Rapid Cycle Pressure Swing Adsorption (RCPSA)," QuestAir, 4 pgs.

(Continued)

*Primary Examiner* — Frank Lawrence
(74) *Attorney, Agent, or Firm* — ExxonMobil Upstream Research Company Law Department

(57) ABSTRACT

A swing adsorption process for removing contaminants from a gaseous feed stream through a combination of a selective adsorbent material containing an effective amount of a non-adsorbent filler, adsorbent contactor design, and adsorption cycle design.

29 Claims, 12 Drawing Sheets

(52) U.S. Cl.
CPC ..... *B01D2253/308* (2013.01); *B01D 2257/304* (2013.01); *B01D 2257/504* (2013.01); *B01D 2259/40018* (2013.01); *B01D 2259/40033* (2013.01); *B01D 2259/40041* (2013.01); *B01D 2259/40043* (2013.01); *B01D 2259/4068* (2013.01); *B01D 2259/40075* (2013.01); *Y02C 10/08* (2013.01)

(56) References Cited

U.S. PATENT DOCUMENTS

| | | | |
|---|---|---|---|
| 3,142,547 A | 7/1964 | Marsh et al. | |
| 3,508,758 A | 4/1970 | Strub | |
| 3,602,247 A | 8/1971 | Bunn et al. | |
| 3,788,036 A | 1/1974 | Lee et al. | |
| 3,967,464 A | 7/1976 | Cormier et al. | |
| 4,261,815 A | 4/1981 | Kelland | |
| 4,324,565 A | 4/1982 | Benkmann | |
| 4,325,565 A | 4/1982 | Winchell | |
| 4,329,162 A | 5/1982 | Pitcher, Jr. | |
| 4,340,398 A | 7/1982 | Doshi et al. | |
| 4,461,630 A | 7/1984 | Cassidy et al. | 55/25 |
| 4,689,062 A * | 8/1987 | MacLean et al. | 62/624 |
| 4,711,968 A | 12/1987 | Oswald et al. | |
| 4,784,672 A | 11/1988 | Sircar | |
| 4,790,272 A | 12/1988 | Woolenweber | |
| 4,816,039 A | 3/1989 | Krishnamurthy et al. | |
| 4,877,429 A | 10/1989 | Hunter | |
| 5,110,328 A | 5/1992 | Yokota et al. | |
| 5,125,934 A | 6/1992 | Krishnamurthy et al. | |
| 5,169,006 A | 12/1992 | Stelzer | |
| 5,174,796 A | 12/1992 | Davis et al. | |
| 5,224,350 A | 7/1993 | Mehra | |
| 5,234,472 A | 8/1993 | Krishnamurthy et al. | |
| 5,292,990 A | 3/1994 | Kantner et al. | |
| 5,306,331 A | 4/1994 | Auvil et al. | |
| 5,354,346 A | 10/1994 | Kumar | 95/101 |
| 5,370,728 A | 12/1994 | LaSala et al. | |
| 5,565,018 A | 10/1996 | Baksh et al. | |
| 5,700,310 A | 12/1997 | Bowman et al. | |
| 5,735,938 A * | 4/1998 | Baksh et al. | 95/101 |
| 5,750,026 A | 5/1998 | Gadkaree et al. | |
| 5,792,239 A | 8/1998 | Reinhold, III et al. | |
| 5,807,423 A | 9/1998 | Lemcoff et al. | |
| 5,811,616 A | 9/1998 | Holub et al. | |
| 5,827,358 A | 10/1998 | Kulish et al. | |
| 5,906,673 A | 5/1999 | Reinhold, III et al. | |
| 5,924,307 A | 7/1999 | Nenov | |
| 5,968,234 A | 10/1999 | Midgett, II et al. | |
| 5,976,221 A | 11/1999 | Bowman et al. | |
| 5,997,617 A | 12/1999 | Czabala et al. | |
| 6,007,606 A | 12/1999 | Baksh et al. | |
| 6,011,192 A | 1/2000 | Baker et al. | |
| 6,053,966 A | 4/2000 | Moreau et al. | |
| 6,063,161 A | 5/2000 | Keefer et al. | |
| 6,099,621 A | 8/2000 | Ho | |
| 6,129,780 A | 10/2000 | Millet et al. | |
| 6,136,222 A | 10/2000 | Friesen et al. | |
| 6,147,126 A | 11/2000 | DeGeorge et al. | |
| 6,171,371 B1 | 1/2001 | Derive et al. | |
| 6,176,897 B1 | 1/2001 | Keefer | |
| 6,179,900 B1 | 1/2001 | Behling et al. | |
| 6,210,466 B1 | 4/2001 | Whysall et al. | |
| 6,231,302 B1 | 5/2001 | Bonardi | |
| 6,245,127 B1 | 6/2001 | Kane et al. | |
| 6,284,021 B1 | 9/2001 | Lu et al. | |
| 6,311,719 B1 | 11/2001 | Hill et al. | |
| 6,345,954 B1 | 2/2002 | Al-Himyary et al. | |
| 6,398,853 B1 | 6/2002 | Keefer et al. | |
| 6,406,523 B1 | 6/2002 | Connor et al. | |
| 6,436,171 B1 | 8/2002 | Wang et al. | |
| 6,444,012 B1 | 9/2002 | Dolan et al. | |
| 6,444,014 B1 | 9/2002 | Mullhaupt et al. | |
| 6,444,523 B1 | 9/2002 | Fan et al. | |
| 6,451,095 B1 | 9/2002 | Keefer et al. | |
| 6,457,485 B2 | 10/2002 | Hill et al. | |
| 6,471,939 B1 | 10/2002 | Boix et al. | |
| 6,488,747 B1 | 12/2002 | Keefer et al. | |
| 6,497,750 B2 | 12/2002 | Butwell et al. | |
| 6,500,241 B2 | 12/2002 | Reddy | |
| 6,500,404 B1 | 12/2002 | Camblor Fernandez et al. | |
| 6,503,299 B2 | 1/2003 | Baksh et al. | 95/98 |
| 6,506,351 B1 | 1/2003 | Jain et al. | |
| 6,517,609 B1 | 2/2003 | Monereau et al. | |
| 6,531,516 B2 | 3/2003 | Davis et al. | |
| 6,533,846 B1 | 3/2003 | Keefer et al. | |
| 6,565,627 B1 | 5/2003 | Golden et al. | |
| 6,565,635 B2 | 5/2003 | Keefer et al. | |
| 6,565,825 B2 | 5/2003 | Ohji et al. | |
| 6,572,678 B1 | 6/2003 | Wijmans et al. | |
| 6,579,341 B2 | 6/2003 | Baker et al. | |
| 6,593,541 B1 | 7/2003 | Herren | |
| 6,595,233 B2 | 7/2003 | Pulli | |
| 6,605,136 B1 | 8/2003 | Graham et al. | |
| 6,607,584 B2 | 8/2003 | Moreau et al. | |
| 6,630,012 B2 | 10/2003 | Wegeng et al. | |
| 6,641,645 B1 | 11/2003 | Lee et al. | |
| 6,651,645 B1 | 11/2003 | Nunez Suarez | |
| 6,660,065 B2 | 12/2003 | Byrd et al. | |
| 6,712,087 B2 | 3/2004 | Hill et al. | |
| 6,746,515 B2 | 6/2004 | Wegeng et al. | |
| 6,752,852 B1 | 6/2004 | Jacksier et al. | |
| 6,802,889 B2 | 10/2004 | Graham et al. | |
| 6,835,354 B2 | 12/2004 | Woods et al. | |
| 6,916,358 B2 | 7/2005 | Nakamura et al. | |
| 6,918,953 B2 | 7/2005 | Lomax, Jr. et al. | |
| 6,974,496 B2 | 12/2005 | Wegeng et al. | |
| 7,025,801 B2 | 4/2006 | Monereau | |
| 7,094,275 B2 | 8/2006 | Keefer et al. | |
| 7,117,669 B2 | 10/2006 | Kaboord et al. | |
| 7,144,016 B2 | 12/2006 | Gozdawa | |
| 7,160,356 B2 | 1/2007 | Koros et al. | |
| 7,160,367 B2 | 1/2007 | Babicki et al. | |
| 7,166,149 B2 | 1/2007 | Dunne et al. | |
| 7,189,280 B2 | 3/2007 | Alizadeh-Khiavi et al. | |
| 7,250,074 B2 | 7/2007 | Tonkovich et al. | |
| 7,276,107 B2 | 10/2007 | Baksh et al. | |
| 7,311,763 B2 | 12/2007 | Neary | |
| RE40,006 E | 1/2008 | Keefer et al. | |
| 7,314,503 B2 | 1/2008 | Landrum et al. | |
| 7,390,350 B2 | 6/2008 | Weist, Jr. et al. | |
| 7,404,846 B2 | 7/2008 | Golden et al. | |
| 7,449,049 B2 | 11/2008 | Thomas et al. | |
| 7,527,670 B2 | 5/2009 | Ackley et al. | |
| 7,578,864 B2 | 8/2009 | Watanabe et al. | |
| 7,604,682 B2 | 10/2009 | Seaton | |
| 7,637,989 B2 | 12/2009 | Bong | |
| 7,641,716 B2 | 1/2010 | Lomax, Jr. et al. | |
| 7,645,324 B2 | 1/2010 | Rode et al. | |
| 7,651,549 B2 | 1/2010 | Whitley | |
| 7,674,319 B2 | 3/2010 | Lomax, Jr. et al. | |
| 7,687,044 B2 | 3/2010 | Keefer et al. | |
| 7,713,333 B2 | 5/2010 | Rege et al. | |
| 7,722,700 B2 | 5/2010 | Sprinkle | |
| 7,731,782 B2 | 6/2010 | Kelley et al. | |
| 7,740,687 B2 | 6/2010 | Reinhold, III | |
| 7,744,676 B2 | 6/2010 | Leitmayr et al. | |
| 7,763,098 B2 | 7/2010 | Alizadeh-Khiavi et al. | |
| 7,819,948 B2 | 10/2010 | Wagner | |
| 7,858,169 B2 | 12/2010 | Yamashita | |
| 7,938,886 B2 | 5/2011 | Hershkowitz et al. | |
| 7,947,120 B2 | 5/2011 | Deckman et al. | |
| 7,959,720 B2 | 6/2011 | Deckman et al. | |
| 8,034,164 B2 | 10/2011 | Lomax, Jr. et al. | |
| 8,071,063 B2 | 12/2011 | Reyes et al. | |
| 8,128,734 B2 | 3/2012 | Song | 95/96 |
| 8,142,745 B2 | 3/2012 | Reyes et al. | |
| 8,142,746 B2 | 3/2012 | Reyes et al. | |
| 8,192,709 B2 | 6/2012 | Reyes et al. | |
| 8,262,783 B2 | 9/2012 | Stoner et al. | |
| 8,268,043 B2 | 9/2012 | Celik et al. | |
| 8,272,401 B2 | 9/2012 | McLean | |
| 8,361,200 B2 | 1/2013 | Sayari et al. | |
| 8,444,750 B2 | 5/2013 | Deckman et al. | |

(56) References Cited

U.S. PATENT DOCUMENTS

| | | | |
|---|---|---|---|
| 8,529,662 B2 | 9/2013 | Kelley et al. | |
| 8,529,663 B2 | 9/2013 | Reyes et al. | |
| 8,529,664 B2 | 9/2013 | Deckman et al. | |
| 8,529,665 B2 | 9/2013 | Manning et al. | |
| 8,545,602 B2 | 10/2013 | Chance et al. | |
| 8,591,627 B2 | 11/2013 | Jain | |
| 2001/0047824 A1 | 12/2001 | Hill et al. | |
| 2002/0124885 A1 | 9/2002 | Hill et al. | |
| 2002/0162452 A1 | 11/2002 | Butwell et al. | |
| 2003/0075485 A1 | 4/2003 | Ghijsen | |
| 2003/0170527 A1 | 9/2003 | Finn et al. | |
| 2003/0205130 A1 | 11/2003 | Neu et al. | |
| 2003/0223856 A1 | 12/2003 | Yuri et al. | |
| 2004/0099142 A1 | 5/2004 | Arquin et al. | |
| 2004/0197596 A1 | 10/2004 | Connor et al. | |
| 2004/0232622 A1 | 11/2004 | Gozdawa | |
| 2005/0109419 A1 | 5/2005 | Ohmi et al. | |
| 2005/0114032 A1 | 5/2005 | Wang | |
| 2005/0129952 A1 | 6/2005 | Sawada et al. | |
| 2005/0145111 A1 | 7/2005 | Keefer et al. | |
| 2005/0150378 A1 | 7/2005 | Dunne et al. | |
| 2005/0229782 A1 | 10/2005 | Monereau et al. | |
| 2005/0252378 A1 | 11/2005 | Celik et al. | |
| 2006/0048648 A1 | 3/2006 | Gibbs et al. | |
| 2006/0049102 A1 | 3/2006 | Miller et al. | |
| 2006/0105158 A1 | 5/2006 | Fritz et al. | |
| 2006/0162556 A1 | 7/2006 | Ackley et al. | |
| 2006/0165574 A1 | 7/2006 | Sayari | |
| 2006/0169142 A1 | 8/2006 | Rode et al. | |
| 2006/0236862 A1 | 10/2006 | Golden et al. | |
| 2007/0084241 A1 | 4/2007 | Kretchmer et al. | |
| 2007/0084344 A1 | 4/2007 | Moriya et al. | |
| 2007/0222160 A1 | 9/2007 | Roberts-Haritonov et al. | |
| 2007/0253872 A1 | 11/2007 | Keefer et al. | |
| 2007/0283807 A1 | 12/2007 | Whitley | |
| 2008/0051279 A1 | 2/2008 | Klett et al. | |
| 2008/0072822 A1 | 3/2008 | White | |
| 2008/0282883 A1 | 11/2008 | Rarig et al. | |
| 2008/0282885 A1 | 11/2008 | Deckman et al. | |
| 2008/0289497 A1 | 11/2008 | Barclay et al. | |
| 2008/0314246 A1 | 12/2008 | Deckman et al. | |
| 2009/0004073 A1 | 1/2009 | Gleize et al. | |
| 2009/0037550 A1 | 2/2009 | Mishra et al. | |
| 2009/0079870 A1 | 3/2009 | Matsui | |
| 2009/0107332 A1 | 4/2009 | Wagner | |
| 2009/0151559 A1 | 6/2009 | Verma et al. | |
| 2009/0241771 A1 | 10/2009 | Manning et al. | |
| 2009/0308248 A1 | 12/2009 | Siskin et al. | |
| 2010/0059701 A1 | 3/2010 | McLean | |
| 2010/0077920 A1 | 4/2010 | Baksh et al. | |
| 2010/0089241 A1 | 4/2010 | Stoner et al. | |
| 2010/0212493 A1 | 8/2010 | Rasmussen et al. | |
| 2010/0251887 A1 | 10/2010 | Jain | |
| 2010/0252497 A1 | 10/2010 | Ellison et al. | |
| 2010/0263534 A1 | 10/2010 | Chuang | |
| 2010/0282593 A1 | 11/2010 | Speirs et al. | |
| 2011/0031103 A1 | 2/2011 | Deckman et al. | |
| 2011/0146494 A1 | 6/2011 | Desai et al. | |
| 2011/0217218 A1 | 9/2011 | Gupta et al. | |
| 2011/0277629 A1 | 11/2011 | Manning et al. | |
| 2011/0315009 A1* | 12/2011 | Ambriano et al. | 95/26 |
| 2012/0024152 A1 | 2/2012 | Yamawaki et al. | |
| 2012/0031144 A1 | 2/2012 | Northrop et al. | |
| 2012/0067216 A1 | 3/2012 | Corma-Canos et al. | |
| 2012/0152115 A1 | 6/2012 | Gerds et al. | |
| 2012/0222551 A1 | 9/2012 | Deckman | |
| 2012/0222552 A1 | 9/2012 | Ravikovitch et al. | |
| 2012/0222553 A1 | 9/2012 | Kamakoti et al. | |
| 2012/0222554 A1 | 9/2012 | Leta et al. | |
| 2014/0033919 A1* | 2/2014 | Deckman et al. | 95/100 |

FOREIGN PATENT DOCUMENTS

| | | |
|---|---|---|
| CA | 2 228 206 | 7/1998 |
| CA | 2 297 590 | 8/2000 |
| CA | 2 297 591 | 8/2000 |
| CA | 2 237 103 | 12/2001 |
| CA | 2 357 356 | 3/2002 |
| EP | 0257493 | 2/1988 |
| EP | 0426937 | 5/1991 |
| EP | 1 004 341 | 5/2000 |
| EP | 1 018 359 | 7/2000 |
| EP | 1018359 | 7/2000 |
| EP | 1413348 | 8/2002 |
| EP | 1577561 | 9/2005 |
| EP | 1 203 610 | 12/2005 |
| EP | 1203610 | 12/2005 |
| EP | 1798197 | 6/2007 |
| EP | 1045728 | 11/2009 |
| JP | 59-232174 | 12/1984 |
| JP | 2000024445 | 8/2001 |
| JP | 2002348651 | 12/2002 |
| JP | 2006016470 | 1/2006 |
| JP | 2006036849 | 2/2006 |
| WO | WO 99/43418 | 9/1999 |
| WO | WO00/35560 | 6/2000 |
| WO | WO2005/032694 | 4/2005 |
| WO | WO2005/070518 | 8/2005 |
| WO | WO2006/017940 | 2/2006 |
| WO | WO2006/074343 | 7/2006 |
| WO | WO 2007/111738 | 10/2007 |
| WO | WO 2010/123598 | 10/2010 |
| WO | WO 2010/130787 | 11/2010 |
| WO | WO 2011/139894 | 11/2011 |
| WO | WO2012/118755 | 9/2012 |
| WO | WO2012/118757 | 9/2012 |
| WO | WO2012/118758 | 9/2012 |
| WO | WO2012/118759 | 9/2012 |
| WO | WO2012/118760 | 9/2012 |
| WO | WO2012/161826 | 11/2012 |
| WO | WO2012/161828 | 11/2012 |
| WO | WO2013/022529 | 2/2013 |

OTHER PUBLICATIONS (2008), "Rapid Cycle Pressure Swing Adsorption," ExxonMobil Research and Engineering, 2 pgs.

Conviser, (1964) "Removal of CO2 from Natural Gas With Molecular Sieves," *Publication*, pp. 1F-12F.

Ge Oil & Gas (2007) "Dry Gas Seal Retrofit," Florene, Italy, www.ge.com/oilandgas.

Farooq, et al. (1990) "Continuous Contercurrent Flow Model for a Bulk PSA Separation Process," *AIChE J.*, v36 (2) p. 310-314.

FlowServe "Exceeding Expectations, US Navy Cuts Maintenance Costs With Flowserve GX-200 Non-Contacting Seal Retrofits," *Face-to-Face*, v17.1, no date given.

Herrmann, et al. (2008) "Curvelet-Based Seismic Data Processing: A Multiscaleand Nonlinear Approach," *Geophysics*, v73.1, pp. A1-A5.

Hopper, et al. (2008) "World's First 10,000 psi Sour Gas Injection Compressor," *Proceedings of the 37$^{th}$ Turbomachinery Symosium*, pp. 73-95.

Reyes, et al. (1997) "Frequency Modulation Methods for Diffusion and Adsorption Measurements in Porous Solids," *J. Phys. Chem. B.* v101, pp. 614-622.

Sahni, et al. (2005) "Multiresolution Wavelet Analysis for Improved Reservoir Description," SPE-87820, *Soc. of Petroleum Eng.-Reservoir Evaluation & Engineering*, pp. 53-69 (XP-002550569).

Stahley, (2003) "Design, Operation, and Maintenance Considerations for Improved Dry Gas Seal Realiability in Centrifugal Compressors,".

Suzuki, (1985) "Continuous-Countercurrent-Flow Approximation for Dynamic Steady State Profile of Pressure Swing Adsorption" *AIChE Symp. Ser.* v81 (242) pp. 67-73.

\* cited by examiner

METHODS OF REMOVING CONTAMINANTS FROM A HYDROCARBON STREAM BY SWING ADSORPTION AND RELATED APPARATUS AND SYSTEMS

CROSS-REFERENCE TO RELATED APPLICATION

This application is the National Stage entry under 35 U.S.C. 371 of PCT/US2012/026804 that published as Intl. Patent App. Pub. No. 2012/161826 and was filed on 27 Feb. 2012, which claims the priority benefit of U.S. Provisional Patent Application 61/594,824 filed 3 Feb. 2012 entitled Methods Of Removing Contaminants From A Hydrocarbon Stream By Swing Adsorption And Related Apparatus And Systems and U.S. Provisional Application 61/448,121 entitled METHODS OF REMOVING CONTAMINANTS FROM A HYDROCARBON STREAM BY SWING ADSORPTION AND RELATED APPARATUS AND SYSTEMS filed 1 Mar. 2011, each of which is incorporated by reference herein.

This application is related to U.S. Patent Application No. 61/448,117 entitled APPARATUS AND SYSTEMS HAVING AN ENCASED ADSORBENT CONTACTOR AND SWING ADSORPTION PROCESSES RELATED THERETO, filed Mar. 1, 2011; U.S. Patent Application No. 61/448,120 entitled APPARATUS AND SYSTEMS HAVING A RECIPROCATING VALVE HEAD ASSEMBLY AND SWING ADSORPTION PROCESSES RELATED THERETO, filed Mar. 1, 2011; U.S. Patent Application No. 61/448,121 entitled METHODS OF REMOVING CONTAMINANTS FROM A HYDROCARBON STREAM BY SWING ADSORPTION AND RELATED APPARATUS AND SYSTEMS, filed Mar. 1, 2011; U.S. Patent Application No. 61/448,123 entitled APPARATUS AND SYSTEMS HAVING A ROTARY VALVE ASSEMBLY AND SWING ADSORPTION PROCESSES RELATED THERETO, filed Mar. 1, 2011; and U.S. Patent Application No. 61/448,125 entitled APPARATUS AND SYSTEMS HAVING COMPACT CONFIGURATION MULTIPLE SWING ADSORPTION BEDS AND METHODS RELATED THERETO, filed Mar. 1, 2011, each of which is herein incorporated by reference in its entirety.

FIELD OF THE INVENTION

This invention relates to swing adsorption processes and equipment for removal of contaminants from gaseous feed streams.

BACKGROUND OF THE INVENTION

Gas separation is important in many industries and can be accomplished by conducting a mixture of gases over an adsorbent material that preferentially adsorbs a more readily adsorbed component relative to a less readily adsorbed component of the mixture. One of the more important types of gas separation technologies is swing adsorption.

In swing adsorption processes, the adsorbent bed is regenerated following the adsorption step using a variety of methods including pressure swing (PSA), vacuum swing (VSA), temperature swing (TSA), purging (e.g., partial pressure swing adsorption (PPSA)), and combinations thereof. For example, a typical PSA cycle comprises the following steps: adsorption, depressurization, purging, and re-pressurization. When performing the separation at high pressure, depressurization and re-pressurization (also referred to as equalization) is achieved in multiple steps to reduce the pressure change for each step and to improve efficiency of the process. In some swing adsorption processes, especially rapid cycle processes, a large fraction of the total cycle time is spent on regeneration. Any reductions in the time interval for regeneration results in less total cycle time, which further results in reducing the overall size of the swing adsorption system.

Depressurization and re-pressurization steps in a swing adsorption process having adsorbent beds are typically performed by interconnecting the beds together and allowing the beds to equalize between each other. That is, an adsorbent bed in an adsorption unit at higher pressure is connected to another adsorbent bed at a lower pressure via piping and valves to equalize the beds. For large PSA systems, the adsorbent beds are not always physically located near each other, and therefore the piping length and resulting equalization time may introduce additional delays in the cycle interval. Furthermore, with the communication between adsorbent beds, the cycles of the two adsorbent beds have to be coordinated such that the first adsorbent bed begins the depressurization step at precisely the same time that the second adsorbent bed begins re-pressurization. Such synchronization of cycles is challenging and further complicates maintenance and other operations.

As an alternative approach to this process, certain processes utilize a pressure vessel to capture the gas removed during a depressurization step for use later in the process. As an example, the use of external pressure vessels in pressure swing absorption devices has been described in U.S. Pat. Nos. 3,142,547; 3,788,036; 4,340,398; 4,816,039 and 5,565,018. These devices, however, use the external vessel to store gas for the purging step in the cycle. As a result, these references still have the dependency between adsorbent beds, which is challenging to synchronize the cycles for the various adsorbent beds. Further, the inter-dependency may introduce additional downtime for maintenance on one of the adsorbent beds in the cycle.

There remains a need in the industry for apparatus, methods, and systems that are more efficient and that can be constructed and employed to enhance the operation of a swing adsorption processes. The need exists for a process and system that reduces the regeneration time interval, which results in more production of the desired products for a given size and quantity of adsorbent beds. Further, the need exists for a process and system that provides for independent operation of each bed to reduce the dependency between adsorbent beds that are part of the swing adsorption system.

SUMMARY OF THE INVENTION

One or more embodiments relate to a cyclical swing adsorption process for removing contaminants from gas feed streams. The process comprises the steps of: a) passing a gaseous feed stream at a feed pressure through a adsorbent bed unit having an adsorbent bed to separate one or more contaminants from the gaseous feed stream to form a product stream; b) interrupting the flow of the gaseous feed stream; c) performing a plurality of depressurization steps, wherein each depressurization step comprises passing a portion of the gas from the adsorbent bed unit into one or more equalization vessels that are dedicated to the adsorbent bed unit and the depressurization step to reduce the pressure within the adsorbent bed unit; d) performing a plurality of re-pressurization steps, wherein each re-pressurization step comprises passing the portion of the gas from one or more equalization vessels associated with one of the plurality of depressurization steps to the adsorbent bed unit to increase the pressure within the adsorbent bed unit; and e) repeating the steps a) to d) for at least one additional cycle.

In other embodiments an adsorbent bed assembly is described. The adsorbent bed assembly may include a housing, an adsorbent bed, an inlet conduit, an outlet conduit, and a plurality of equalization vessels. The housing may have an interior region and BG configured to maintain a pressure from 0 bar a to 80 bar a within the interior region, while the adsorbent bed disposed in the interior region and having a plurality of flow channels through the adsorbent bed, wherein the plurality of flow channels have an adsorbent material disposed on at least one surface within the plurality of flow channels. The inlet conduit is disposed adjacent to the adsorbent bed and configured to pass a stream into the interior region from a location external to the housing, while the outlet conduit is disposed adjacent to the adsorbent bed and configured to pass a stream into the interior region from a location external to the housing. The plurality of equalization vessels may be in fluid communication with the interior region and dedicated to the adsorbent bed. Further, at least one of the plurality of equalization vessels may be configured to support the housing and adsorbent bed.

In yet other embodiments, a swing adsorption system is described. The swing adsorption system may include a plurality of adsorbent bed assemblies, wherein each adsorbent bed assembly comprises a housing having an interior region and configured to maintain a pressure from 0 bar a to 80 bar a within the interior region; an adsorbent bed disposed in the interior region and having a plurality of flow channels through the adsorbent bed, wherein the plurality of flow channels have an adsorbent material disposed on at least one surface within the plurality of flow channels; an inlet conduit disposed adjacent to the adsorbent bed and configured to pass a stream into the interior region from a location external to the housing; an outlet conduit disposed adjacent to the adsorbent bed and configured to pass a stream into the interior region from a location external to the housing; and a plurality of equalization vessels in fluid communication with the interior region and dedicated to the adsorbent bed.

The process may also include other various steps to enhance the process, which may be performed along with steps a) through d) in a time interval less than about 60 seconds, or less than about 20 seconds. For instance, the process may include a step of purging the adsorbent bed unit after the plurality of depressurization steps and before the plurality of equalization steps. Also, the process may include one or more blow-down steps to reduce the pressure in the adsorbent bed unit after the plurality of depressurization steps and before the plurality of equalization steps.

The adsorbent bed assembly may also further include additional equipment. For example, each of the plurality of equalization vessels may have a pressure reset valve and be configured to exchange fluids with a conduit in a first position and to prevent fluid flow to the conduit in a second position. Also, each of the plurality of equalization vessels may be configured to exchange fluids with the housing during one of a plurality of re-pressurization steps and one of a plurality of depressurization steps in each cycle and configured to prevent fluid flow in other re-pressurization steps and other depressurization steps in each cycle.

BRIEF DESCRIPTION OF THE DRAWINGS

The invention is further described with reference to the accompanying drawings in which.

DETAILED DESCRIPTION OF THE INVENTION

Figure 1:
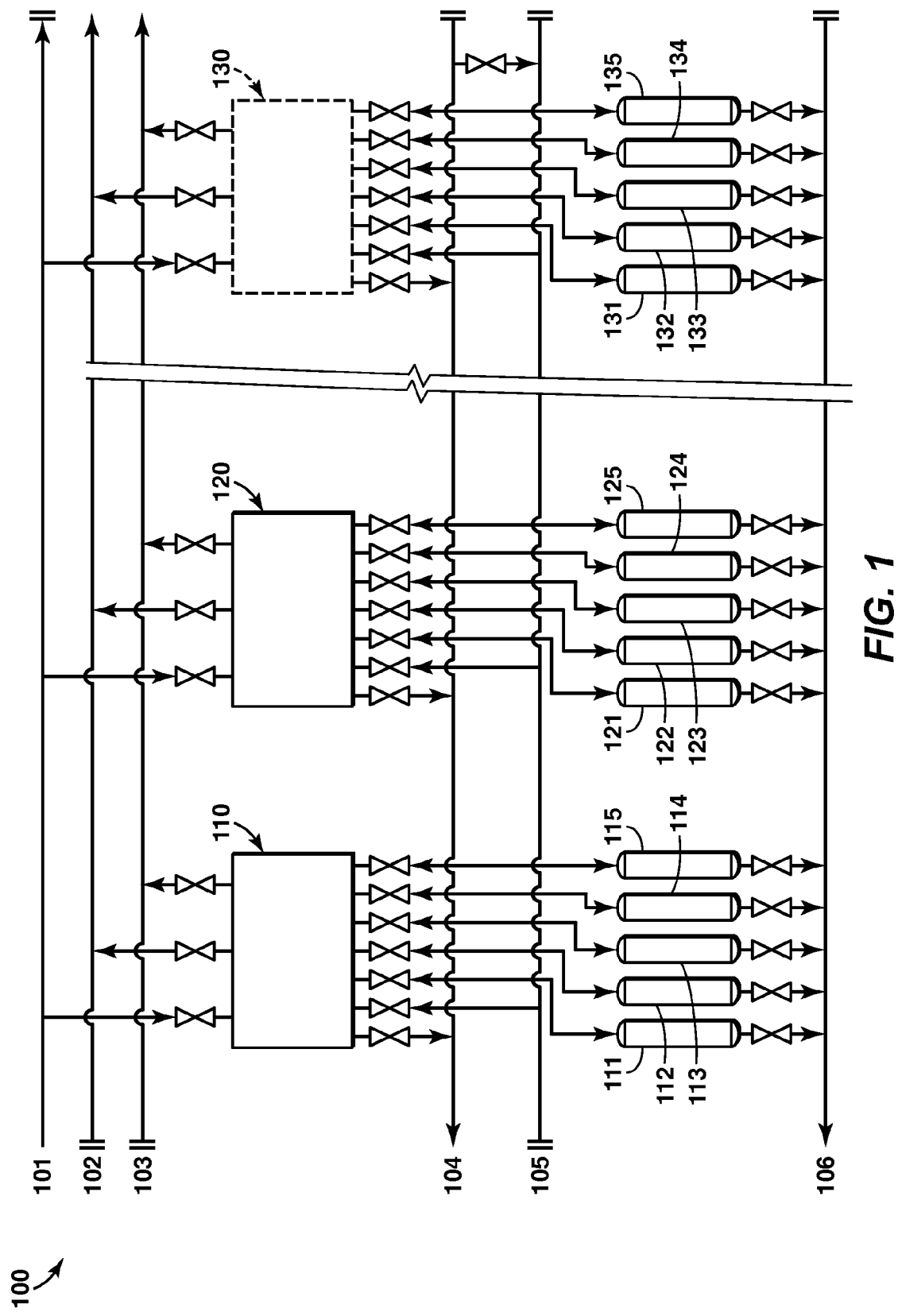
FIG. 1 is a diagram of a swing adsorption system utilizing equalization tanks in accordance with an exemplary embodiment having five equalization steps and one equalization tank per equalization step.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, will control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Other applications in the technical area include U.S. Patent Application Nos. 61/447,806, 61/447,812, 61/447,824, 61/447,848, 61/447,869, 61/447,835, and 61/447,877, each of which is herein incorporated by reference in its entirety.

The present invention can be broadly applied to all swing adsorption processes including temperature swing adsorption (PSA), pressure swing adsorption (PSA), partial pressure swing adsorption (PPSA), vacuum swing adsorption (VSA), and combinations thereof. In particular, the present invention relates to rapid swing adsorption processes, which operate with cycle times in the range of minutes or seconds rather than hours or days. The rapid swing adsorption processes, which include rapid cycle pressure swing adsorption (RC-PSA) and rapid cycle temperature swing adsorption (RC-TSA), provide various benefits relative to conventional separations technologies. By operating with cycle times in the range of minutes or seconds rather than hours or days, the amount of adsorbent material utilized in the process can be significantly reduced, which results in equipment that is smaller, lighter, and offers better performance. For certain adsorbent materials, the differences in diffusion speeds of contaminants versus product gas can be utilized to enhance the selectivity of the separation process. These processes, which are referred to as kinetic separations, are operated with cycle times such that the majority of the contaminant has been adsorbed before a substantial amount of the product gas can diffuse into the adsorbent material. To further enhance these kinetic separations, the process should combine certain adsorbent materials with a specific sequence of steps in the cycle to enhance product recovery while maintaining the purity specification for the product gas. These rapid cycle swing adsorption systems generally require lower energy input and are smaller and have less equipment compared to conventional technologies. Several such rapid cycle adsorption processes are described in Intl. Patent Application Publication Nos. 2008/143823; 2008/143826; 2008/143820; 2008/143825; and 2008/143821 along with U.S. Application Nos. 61/448,121; 61/447,848, 61/447,869, 61/447,877, which are incorporated herein by reference in their entirety.

In swing adsorption processes, the cycle typically involves two or more steps that each has a certain time interval, which are summed together to be the cycle time. These steps include regeneration of the adsorbent bed following the adsorption step using a variety of methods including pressure swing, vacuum swing, temperature swing, purging (via any suitable type of purge for the process), and combinations thereof. As an example, a PSA cycle may include the steps of adsorption, depressurization, purging, and re-pressurization. When performing the separation at high pressure, depressurization and re-pressurization (which may be referred to as equalization) is performed in multiple steps to reduce the pressure change for each step and enhance efficiency. In some swing adsorption processes, in particular rapid cycle swing adsorption processes, a substantial portion of the total cycle time is involved in the regeneration of the adsorbent bed. Accordingly, any reductions in the amount of time for regeneration results in a reduction of the total cycle time, thereby reducing the overall size of the swing adsorption system.

Unlike conventional systems that re-pressurize adsorbent beds through other beds or a shared pressure vessel, the present invention utilizes individual pressure vessels for each equalization step for a single adsorbent bed, which may be part of an adsorbent bed system comprised of multiple adsorbent beds. These external pressure vessels, which may be referred to as equalization vessels or tanks, are utilized in the process to lessen the time interval for equalization steps, thereby decreasing the total cycle time. This result is achieved by providing one or more equalization vessels for each equalization step in a cycle for each adsorbent bed. Gas withdrawn from the adsorbent bed during each depressurization step is stored in one or more equalization vessels that are dedicated to the adsorbent bed. The stored gas is then utilized in a re-pressurization step for the same adsorbent bed during the one or more re-pressurization steps. As the dedicated equalization vessels are connected directly to an adsorbent bed, the time interval for equalization between an adsorbent bed and an equalization tank is typically less than the time interval for equalization between two adsorbent beds. That is, the cycle time for a swing adsorption process can be reduced by using one or more independent equalization vessels per equalization step for each adsorbent bed in a system.

For each equalization step in a given cycle, N pressure vessels can be used as equalization tanks. The number of equalization vessels per step is determined based on the volume needed, the space available, and other factors in the design of the swing adsorption system. The number of equalization vessels, N, can be from 1 to 25, 1 to 20, or preferably 1 to 10 tanks. If M equalization steps are required in a cycle, then N×M total pressure vessels are utilized for each adsorbent bed. The number of equalization steps in the cycle, M, can range from 1 to 30 steps, 1 to 20 steps, or preferably 1 to 10 steps. Further, the ratio of the pressure within the adsorbent bed unit at one depressurization step divided by the pressure within the adsorbent bed unit at a subsequent depressurization step is less than about 0.98. Similarly, the ratio of the pressure within the adsorbent bed unit at one re-pressurization step divided by the pressure within the adsorbent bed unit at a previous re-pressurization step is less than about 0.98.

Further, these equalization vessels may be utilized to enhance the operation of processes utilizing the system. For instance, the use of the equalization vessels may lessen the size or footprint of the swing adsorption system. That is, the reduced cycle time lessens the amount of adsorbent material required in the adsorbent bed, which reduces the overall size and weight of the swing adsorption system (e.g., lower purge flow rates, lower recycle compression, etc.). In addition, by locating the equalization vessels or equalization tanks close to the adsorbent bed, piping and valves may be reduced (e.g., shortened), which further reduces the footprint and weight from the associated piping and valves. Moreover, the time for each equalization step can be lessened and the total cycle time can be reduced because the distance the gaseous streams have to flow between steps is lessened. Also, the pressure drop associated with the piping and valves may be lessened because the equalization vessels may be located adjacent to the adsorbent bed and/or in a location beneficial to the adsorbent bed because the equalization bed is dedicated to a single adsorbent bed. As an exemplary embodiment, the equalization tanks may be utilized as structural support for the adsorbent bed, thereby minimizing the distance of the piping between the equalization tanks and the adsorbent bed.

Furthermore, the use of equalization vessels may enhance the operation of the system. For example, a swing adsorption system may include two or more adsorbent beds. The use of equalization vessels with a single adsorbent bed reduces or eliminates dependency on other adsorbent beds. That is, the adsorbent beds may operate independently by eliminating the need for synchronization and providing greater flexibility in design of the swing adsorption system. This also provides flexibility in maintenance of the swing adsorption system by allowing certain beds to be removed from operation without having to shutdown other adsorbent beds or modify the operation of the other adsorbent beds.

As a further enhancement, one or more embodiments of the present invention may include addition of equipment (e.g. piping and valves) and a process step to reset the pressure in each equalization vessel or tank during each cycle. The gas from this pressure reset step may be collected and recycled into the feed of the swing adsorption system or used for other purposes in the facility (e.g., fuel gas). While in conventional pressure vessel(s) the pressure levels in the vessel(s) are returned to their starting pressure through various steps (e.g., purge steps, bed-to-bed equalizations, or product delivery), the pressure levels in the equalization tanks do not return to the initial pressure levels because the equalization tanks are dedicated to a particular adsorbent bed and a particular equalization step. Accordingly, the equalization tanks should be coupled to piping and valves to adjust the pressure to a predetermined or initial pressure level and/or another pressure level. Furthermore, the additional pressure may be recovered by the process and utilized by the process to enhance energy efficiency. Exemplary embodiments of the present invention are described further in FIGS. 1 to 11.

FIG. 1 is a diagram of a swing adsorption system utilizing equalization tanks in accordance with an exemplary embodiment. In this diagram, a swing adsorption system 100 may include one equalization vessel 111-115, 121-125 and 131-135 (e.g., N=1) for each adsorbent bed units 110, 120, 130, which are each associated with an equalization step (e.g., five equalization steps in the cycle that has M=5). The adsorbent bed units 110, 120, 130 may each include a housing or pressure vessel and adsorbent bed disposed within the interior region of the housing. The adsorbent bed units also include various conduits to pass fluids to and from the interior region. For example, the adsorbent bed units may include at least one inlet conduit disposed adjacent to the adsorbent bed and configured to pass a stream into the interior region from a location external to the housing and at least one outlet conduit disposed adjacent to the adsorbent bed and configured to pass a stream into the interior region from a location external to the housing. The equalization vessels 111-115, 121-125 and 131-135 may include pressure vessels, such as tanks, pipes or other suitable device. These equalization vessels 111-115, 121-125 and 131-135 may be configured to handle pressures from 0 to 100 bar a, and temperatures from 0° C. to 300° C. Further, the equalization vessels 111-115, 121-125 and 131-135 may be configured to handle certain processing environments, such as reducing environments and/or oxidizing environments.

This system 100 may also include other equipment to manage the flow of fluids in the process. For example, various conduits 101-106 may be utilized to pass gaseous streams through the adsorbent bed units 110, 120 and 130. The conduits may include pipes or other tubular members utilized to manage the flow of fluids between two locations. Also, the system 100 may include various valves that are utilized to manage which flow paths are available between the conduits 101-106, equalization vessels 111-115, 121-125 and 131-135, and the adsorbent bed units 110, 120 and 130. These valves may include conventional process valves, such as globe valves, plug valves, gate valves, butterfly valves, ball valves, and the like, or more rapid valves such as reciprocating valves, poppet valves, or rotary valves.

As an example, a swing adsorption system may include sixteen adsorbent beds to provide a continuous feed and product flow at a target capacity. Based on the configuration of FIG. 1, a total of eighty equalization tanks are required for the swing adsorption system to provide five equalization steps. A cycle in the process may include an adsorption step that has a time interval of 3 seconds, hold step of 0.1 seconds, depressurization step of 0.25 seconds, hold step of 0.1 seconds, depressurization step of 0.25 seconds, hold step of 0.1 seconds, depressurization step of 0.25 seconds, hold step of 0.1 seconds, depressurization step of 0.25 seconds, hold step of 0.1 seconds, depressurization step of 0.25 seconds, hold step of 0.1 seconds, a blow-down step 1.25 seconds, hold step of 0.1 seconds, purge step of 2 seconds, hold step of 0.1 seconds, re-pressurization step of 0.25 seconds, hold step of 0.1 seconds, re-pressurization step of 0.25 seconds, hold step of 0.1 seconds, re-pressurization step of 0.25 seconds, hold step of 0.1 seconds, re-pressurization step of 0.25 seconds, hold step of 0.1 seconds, re-pressurization step of 0.25 seconds, hold step of 0.1 seconds, and the final re-pressurization step with feed gas for 0.25 seconds. The total time for a cycle may be up to 10.3 seconds. The depressurization steps may include passing the gaseous stream from the respective adsorbent bed to one of the equalization vessels for each step. The gaseous material stored within the equalization tank may then be provided into the adsorbent bed in a subsequent re-pressurization step. This example is further explained in FIG. 2.

Figure 2:
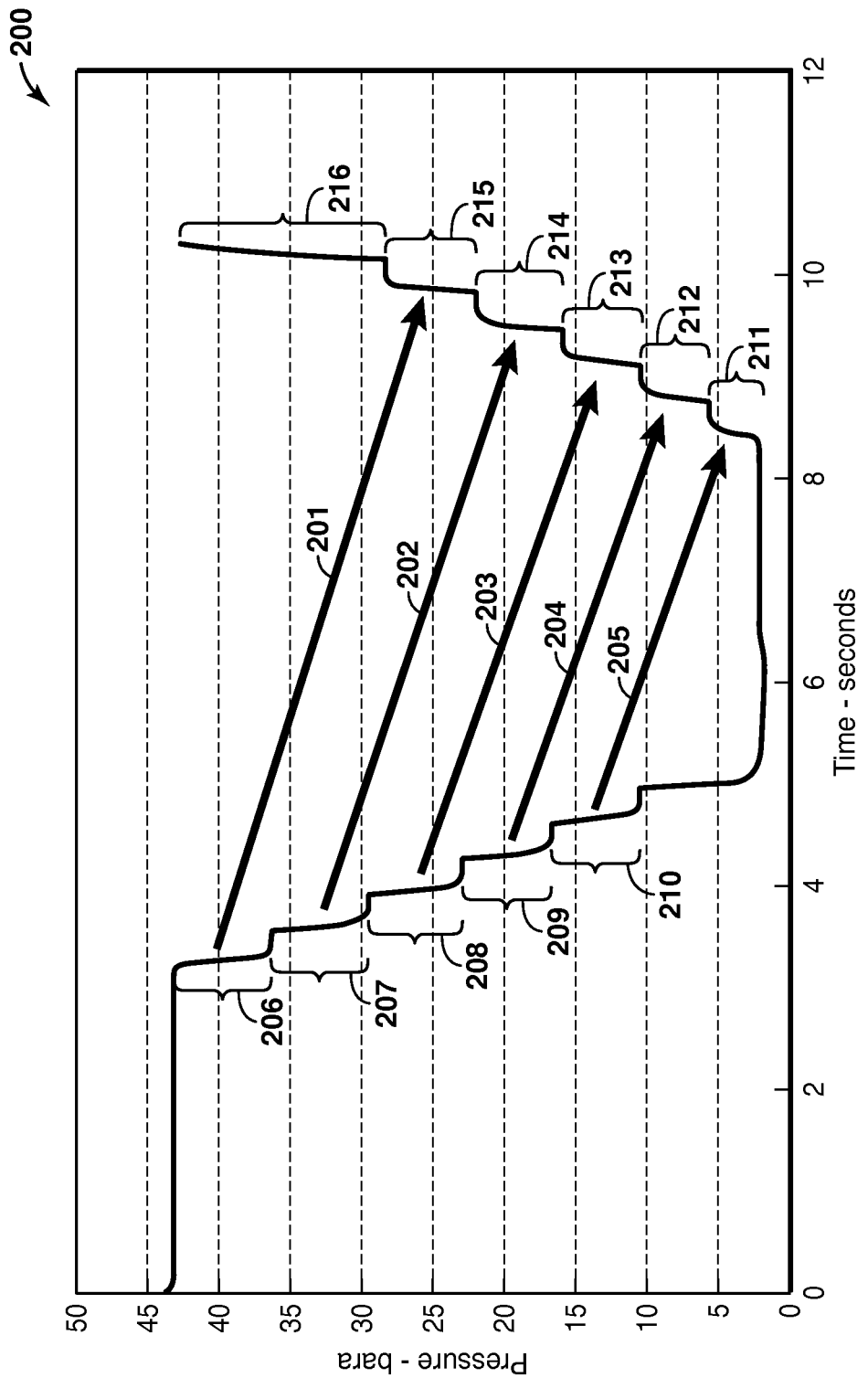
FIG. 2 is a graph of the pressure in the adsorbent bed versus time during an exemplary cycle having five depressurization steps followed by a blowdown, product purge, and five re-pressurization steps and a feed re-pressurization step.

FIG. 2 is a graph of the pressure in the adsorbent bed versus time during an exemplary cycle. In this graph 200, five equalization steps are indicated by arrows 201-205. The equalization steps include the five depressurization steps 206-210 and the five re-pressurization steps 211-216. The depressurization steps may reduce the pressure from about 43 bar absolute (bar a) to about 10 bar a. With reference to FIG. 1, a portion of the gas within the first adsorbent bed unit 110 is conducted to the first equalization tank 111 by passing through the associated conduits and valve during the first depressurization step 206. During the second depressurization step 207, the portion of the gas within the first adsorbent bed unit 110 is conducted to the second equalization tank 112 by passing through the associated conduits and valve. This cycle continues for a third depressurization step 208, a fourth depressurization step 209, and a fifth depressurization step 210, with the respective portions of gas being passed to the third equalization tank 113, a fourth equalization tank 114, and a fifth equalization tank 115, each associated with the respective depressurization step.

Once the depressurization steps 206-210 are complete, the adsorbent bed may be subjected to one or more blow down steps and a purge step to further remove contaminants from the adsorbent bed. In particular, these additional steps may lower the pressure from about 10 bar a to about 2 bar a. The purge step may include the use of product gas, an inert gas such as nitrogen, or gases from other sources that are substantially free of the contaminants. The purge step may also include one or more displacement steps that utilize a gas that is more readily adsorbed into the adsorbent material than the contaminants being removed from the feed stream. The adsorbent bed may also be heated during these steps to promote desorption of the contaminants and further clean the adsorbent bed through the thermal processes.

After the adsorbent bed is depressurized from approximately 43 bar a to approximately 10 bar a in these five depressurization steps, the remaining gas, which includes contaminants, in the adsorbent bed is desorbed by depressurizing the bed to about 2 bar a into a conduit for disposal. At this stage, the regeneration of the adsorbent bed involves re-pressurization to prepare the adsorbent bed for the next adsorption step. This is accomplished using the gas stored in respective equalization tanks 111-115 in the reverse sequential order from the depressurization steps 206-210. In other words, gas at the lowest pressure in the fifth equalization tank 115 is used during the first re-pressurization step, 211, gas in the fourth equalization tank 114 is used during the second re-pressurization step 212. The third re-pressurization step 213, fourth re-pressurization step 214 and fifth re-pressurization step 215 are re-pressurized with the third equalization tank 113, second equalization tank 112 and first equalization tank 111, respectively. The adsorbent bed is then re-pressurized to the initial feed pressure by opening the valve from the feed header in a final re-pressurization step 216. Then, another cycle may begin with the adsorption step.

In certain embodiments, the different equalization vessels associated with each equalization step may result in an increase in pressure within the respective equalization tanks for each cycle. That is, the pressure may continue to increase within the different equalization tanks, if the adsorbent bed assembly does not equalize the pressure within the tanks in each cycle or between certain cycles. This increase in pressure may be managed by operating the multiple cycles in one sequential configuration until the pressure reaches a certain threshold. Then, the gas within the equalization vessel having the highest pressure may be recaptured by the process to enhance efficiencies within the process. In particular, this may be utilized to reduce compression of the gas withdrawn to reset the pressure in the equalization vessels. Further, the recaptured pressure may be utilized for downstream processes. The associated sequence of the equalization steps may be adjusted to move each of the re-pressurization steps to a higher pressure within the sequence, while the equalization vessel that has had its pressure recaptured may be utilized as the lowest pressure vessel in the sequence. Other variations may also be utilized for this process.

As another alternative to managing the pressure within the equalization vessels, pressure reset valves may be utilized and associated with each of the equalization vessels. As an example, as shown in FIG. 1, each of the equalization vessels 111-115, 121-125 and 131-135 include a pressure reset valve in fluid communication and coupled to conduit 106. As it may be appreciated, the conduit 106 may include a dedicated conduit for each equalization vessel, one or more conduits shared by equalization vessels or one common conduit for the equalization vessels. These pressure reset valves may be utilized after each cycle, as part of the cycle, may be staged after a certain number of cycles, or may be based on a pressure threshold based on a measured pressure associated with the respective equalization vessels 111-115, 121-125 and 131-135. An example of the use of these pressure reset valves in a cycle is described below in FIG. 3.

Figure 3:
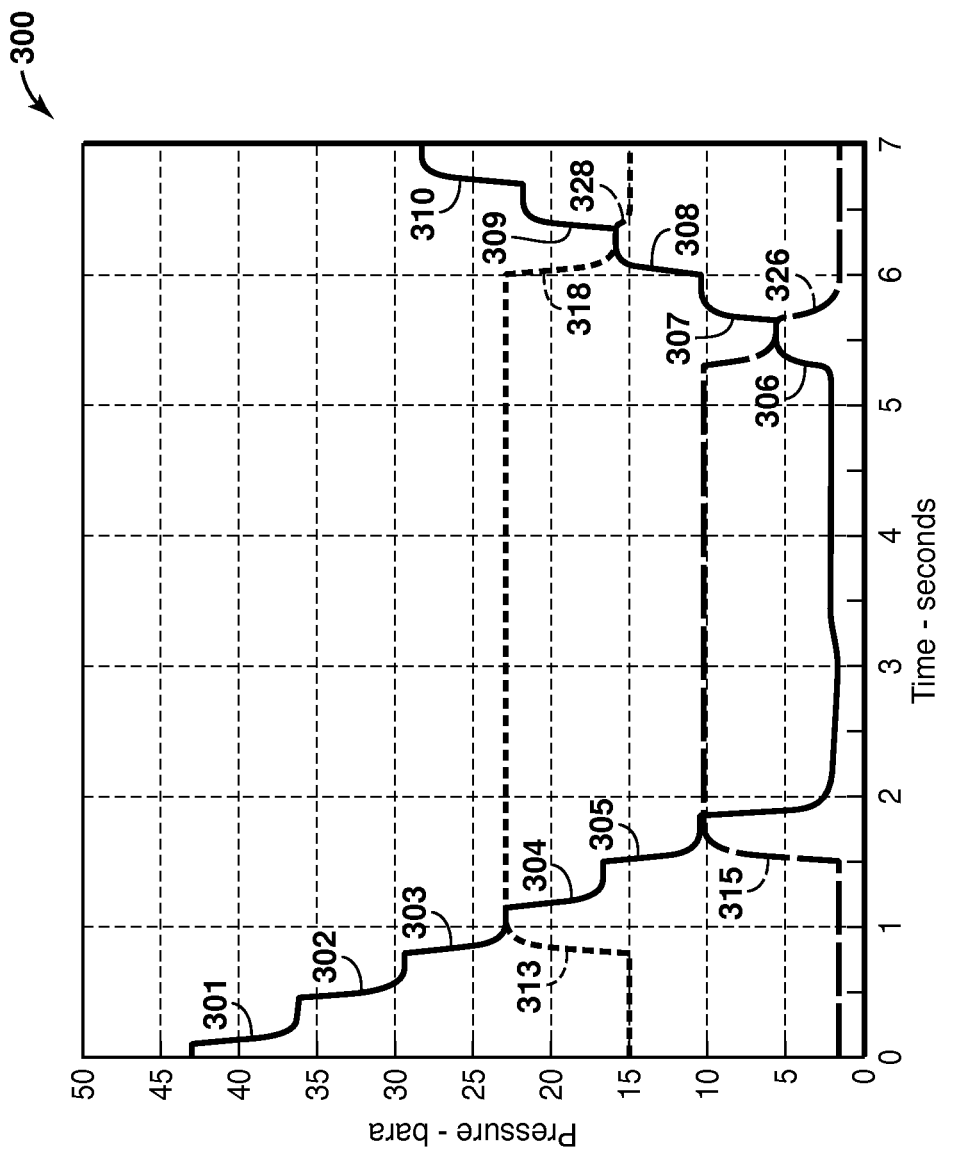
FIG. 3 is a graph of the pressure in the adsorbent bed versus time during an exemplary cycle utilizing the pressure reset valves.

FIG. 3 is a graph of the pressure in the adsorbent bed versus time during an exemplary cycle utilizing the pressure reset valves. In this graph 300, the pressure in the adsorbent bed 301 and the pressure of two of the equalization tanks are shown as a function of time during the cycle. In this process, the steps may be similar to the steps performed in FIG. 2, but the durations of the associated time intervals may be adjusted for this exemplary cycle. Again with reference to FIG. 1, the cycle may include five depressurization steps 301-305 and associated re-pressurization steps 306-310, which may be associated with the equalization vessels 111-115 in a manner similar to that discussed above. In particular, for this graph 300, the third depressurization step 303 has an adsorbent bed pressure that decreases from about 30 bar a to about 23 bar a. Also for this step, the pressure within the equalization vessel 113 increases from about 15 bar a to about 23 bar a, as shown by the response 313. Similarly, during the fifth depressurization step 305, the adsorbent bed pressure decreases from about 17 bar a to about 11 bar a, while the pressure within the fifth equalization vessel 115 increases from about 1 bar a to about 11 bar a, which is shown by the fifth equalization vessel response 315.

After the exhaust steps (e.g., purge steps and one or more blow-down steps), the adsorbent bed is re-pressurized in the first re-pressurization step 306 using gas stored in equalization vessel 115 in which the adsorbent bed is pressurized from about 1 bar a to about 6 bar a, while the pressure in the fifth equalization tank 115 decreases from about 11 bar a to about six bar a, which is shown by the fifth equalization vessel response 316. Similarly, the gas stored in equalization vessel 113 is used during the third re-pressurization step 308 to increase the adsorbent bed pressure from about 11 bar a to about 17 bar a, while the pressure in the third equalization tank 113 decreases from about 23 bar a to about 17 bar a, which is shown by the third equalization vessel response 318. It can be seen from the graph that the pressure in each equalization vessel does not return to its initial pressure due the different starting and ending pressures for each step. Therefore, to maintain steady state operation, the pressure should be reset to the initial pressure for each equalization vessel.

To reset the pressure to the initial pressure, additional valves along with conduits or piping may be utilized to prevent the excess gas in each equalization vessel at the end of each cycle from continuing to increase. Referring to FIG. 1, the pressure reset valves are the valves disposed between the equalization vessels 111-115 and conduit 106. Within the process, the pressure reset valves may be utilized to lessen the pressure within the equalization vessels from the respective equalization pressure to the initial pressure for that respective step.

As an example, the pressure at the end of the first re-pressurization in the fifth equalization tank 115 is about 6 bar a, which may be reduced to about 1 bar a in step 326. Similarly, the pressure in the third equalization tank 113 at the end of the third re-pressurization step 308 may be reduced from about 26 bar a to about 25 bar a in a pressure reset step 328. The pressure reset steps, such as pressure reset steps 326 and 328, may be performed immediately after the re-pressurization step, during the subsequent steps in the cycle or during the subsequent cycle, but prior to the use of the equalization vessel in the subsequent cycle. The gas from the equalization vessels pressure reset steps can be collected in a common header, conduit, or other mechanism handled at the individual pressures for each step. The gas may be recycled back to the feed stream of the swing adsorption system, or it can be used for other purposes within the plant (e.g. fuel gas). It should be recognized that the control of the valves for resetting the equalization tank pressures may be integrated into the control system for operating the adsorbent bed assembly so that the timing is synchronized with the other streams flowing within the cycle.

Figure 4:
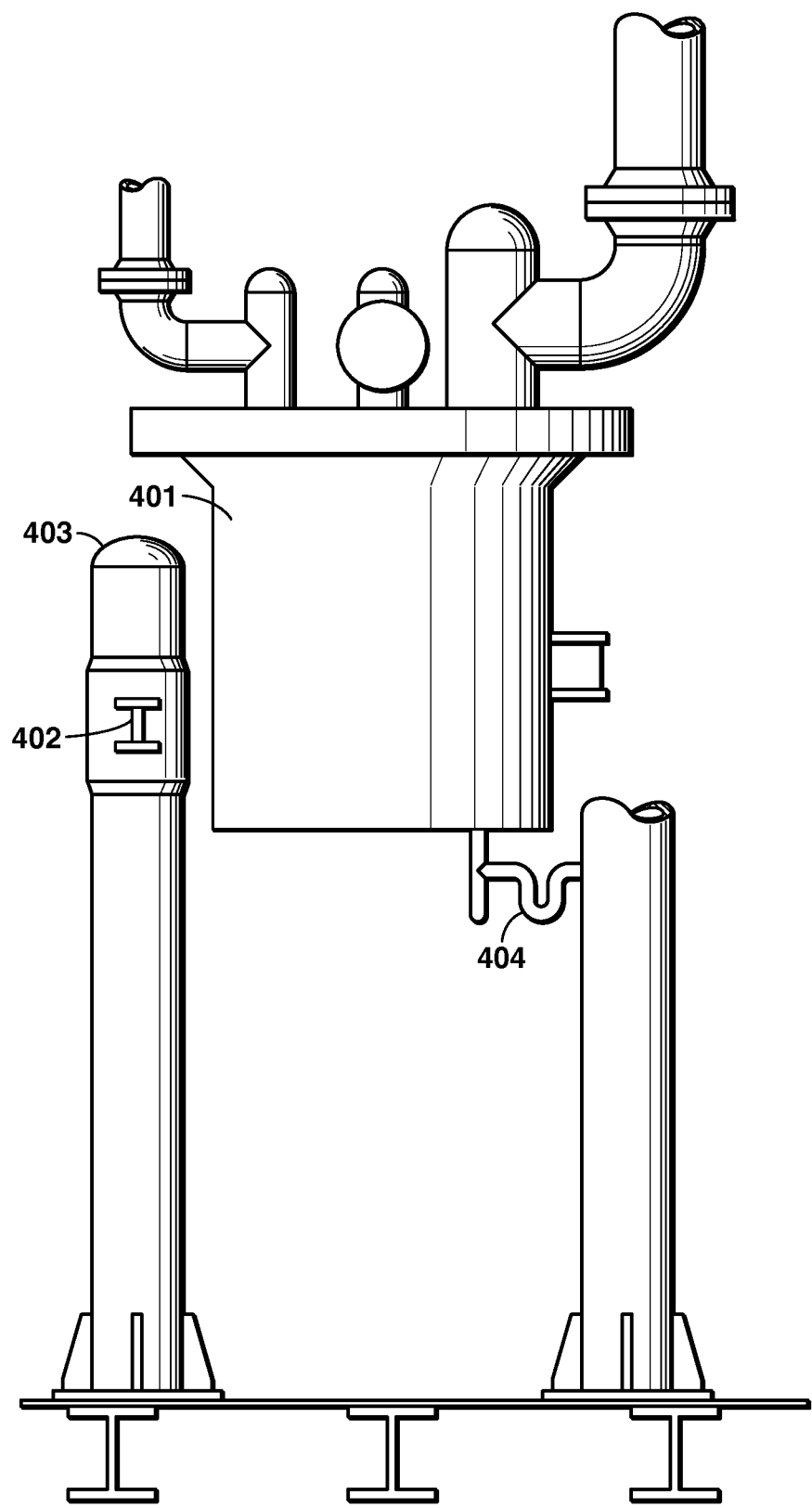
FIG. 4 is a diagram of the elevation view of an exemplary mechanical support for an adsorbent bed assembly whereby the equalization vessels comprise the support structure for the adsorbent bed unit.

To minimize the distance between the adsorbent bed unit and equalization vessels, one or more embodiments may include the use of equalization vessels as structural support members, as shown in FIG. 4. The adsorbent bed unit 401 is supported on crossmembers 402 that are attached to the equalization tanks 403. It is appreciated by those skilled in the art that the sizing of the equalization vessels should be calculated based on both structural and pressure containing loads on the equalization vessels. That is, the size of the equalization vessel may be such that it satisfies both the structural support of the adsorbent bed unit and is able to contain the specified pressure for the process.

In another embodiment, the equalization vessels may include a plurality of pipes having its longitudinal axis in a vertical orientation. One end of the pipe may be sealed with a cap or other suitable pipe sealing mechanism. The sealed end of the pipe may also be coupled to anchoring attachment hardware or may be fabricated with anchoring attachment hardware. This anchoring attachment hardware may be configured to be secured to an equipment skid or pad.

In this embodiment, the one or more conduits or piping 404 and associated valves for each equalization tank are coupled to the adsorbent bed to minimize the piping length. In particular, for this embodiment the conduits 404 for the adsorbent bed unit 401 are in fluid communication with the bed via one of the ends of the adsorbent bed, which may be either of the ends of the vessel depending on the specific configuration of the flow of the process streams.

Figure 5B:
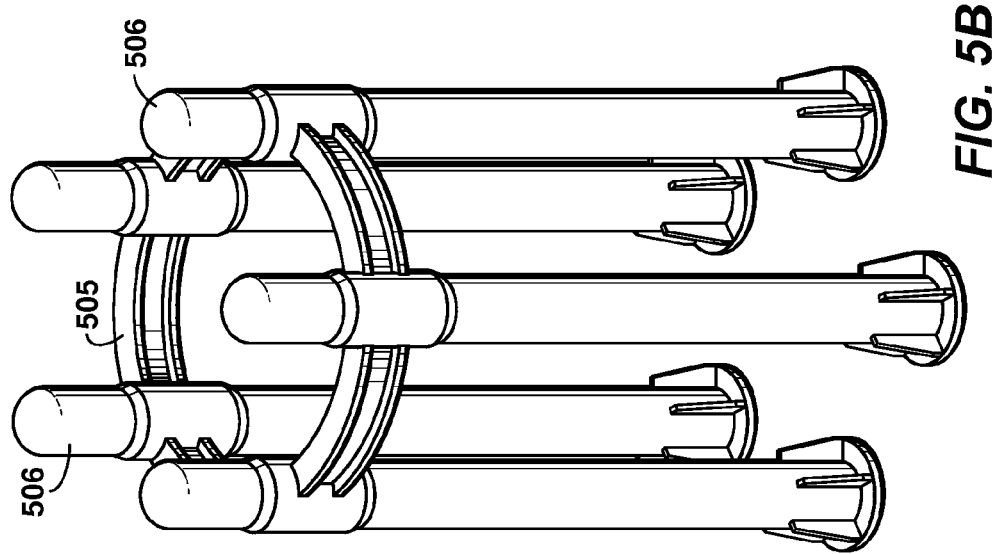
FIGS. 5A-5D are diagrams of an adsorbent bed assembly having the equalization vessels as structural support members for the swing adsorbent bed.
Figure 5A:
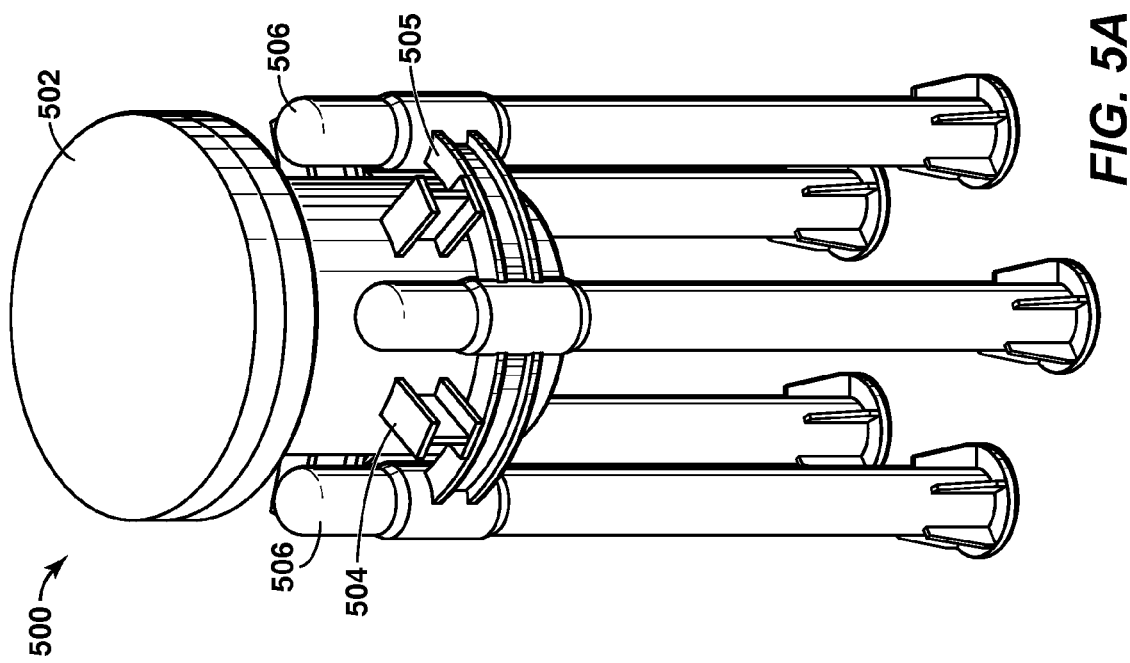

FIGS. 5A and 5B are three-dimensional diagrams of a adsorbent bed assembly having the equalization vessels as structural support members for the adsorbent bed unit. In particular, FIG. 5A is a three-dimensional diagram of the adsorbent bed assembly 500. In this diagram, the adsorbent bed unit 502 is fixedly attached to support members 505 and supported on cross-members 504. The cross-members 504 are fixedly secured to the equalization tanks 506a-506e and may not be fixedly secured to the support member 505 and the adsorbent bed unit 502. That is, the support members 505 may be disposed on the cross-members 504 and configured such that the adsorbent bed unit 502 may move to provide flexibility to reduce piping stress (e.g., move laterally within the structure of the equalization tanks). FIG. 5B is a three-dimensional diagram of the support structure without the adsorbent bed unit 502 and adsorbent bed support member 505.

Figure 5D:
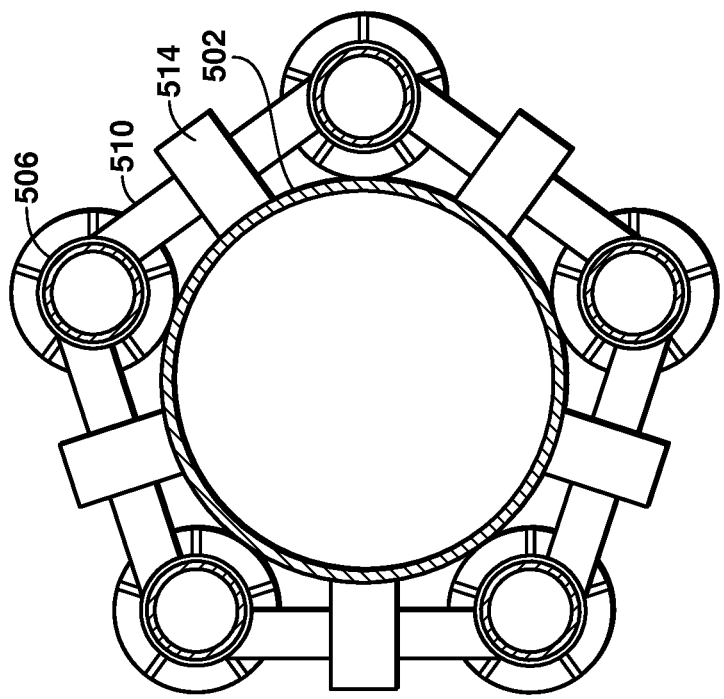
Figure 5C:
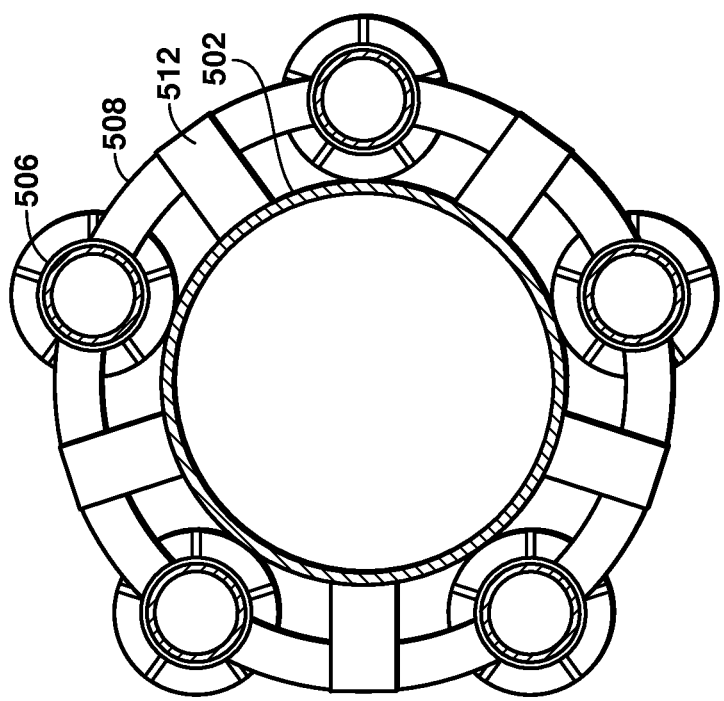

Various configurations of the cross-member can be envisioned as shown in FIGS. 5C and 5D. In particular, FIG. 5C includes a curved cross-member 508, which is the similar to the cross-members 504 of FIGS. 5A and 5B. These curved cross-members 508 are utilized to couple the equalization vessels together and to provide a support base for the adsorbent bed unit 502. This embodiment also has other various support members 512 (similar to support members 505 of FIG. 5A), which are utilized to support and/or secure the adsorbent bed unit 502 via curved cross-member 508 and equalization vessels. These support members 512 may be welded to the adsorbent bed unit 502, configured to engage with notches and/or other suitable means to provide the support the adsorbent bed unit 502. Similarly, FIG. 5D includes straight segmented cross-members 510. These straight segmented cross-members 510 are utilized to couple the equalization vessels together and to provide a support base for the swing adsorbent bed unit 502. Also, this embodiment has other various adsorbent bed support members 514 that are utilized to support the adsorbent bed unit 502 in any suitable manner, which may be similar to the support members 512 of FIG. 5C.

Figure 6:
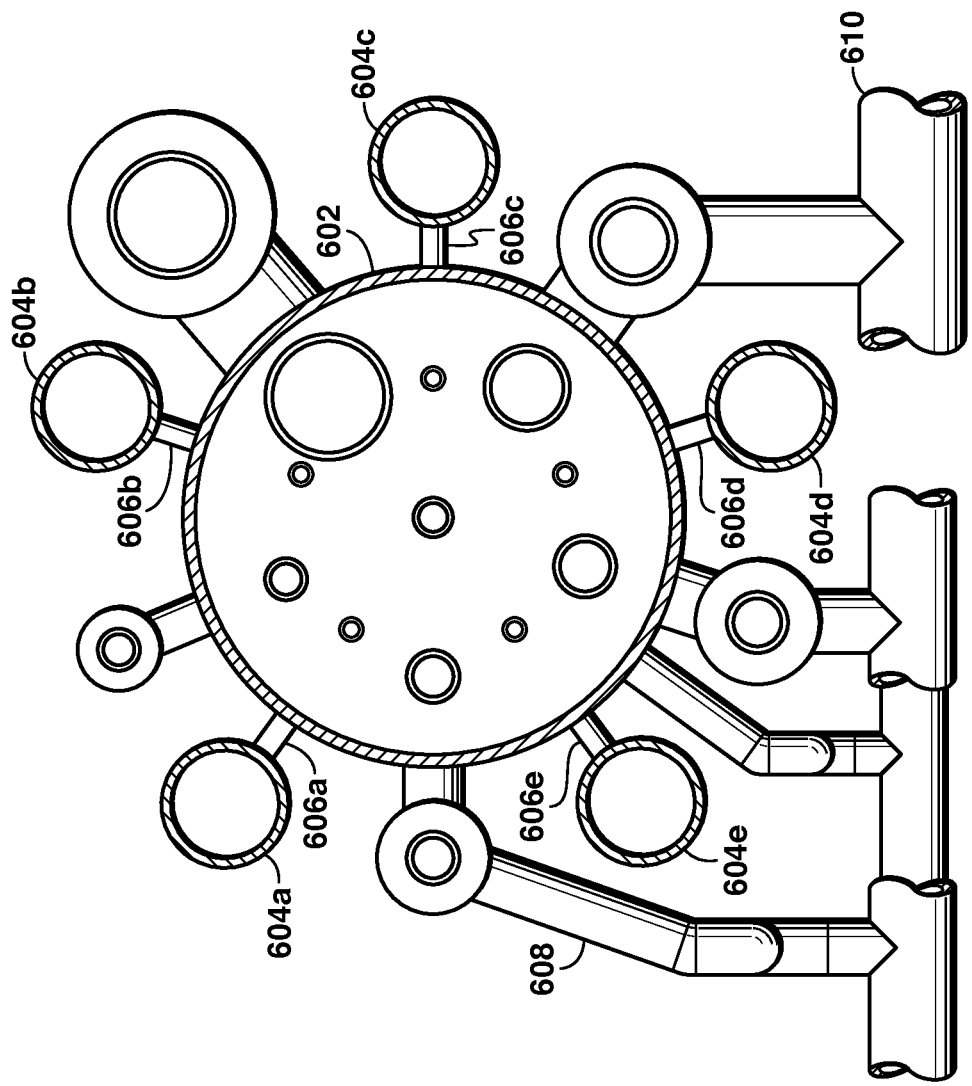
FIG. 6 is a diagram of the top view of a swing adsorption system whereby equalization vessels comprise the structural support members for the swing adsorbent bed.

FIG. 6 is a diagram of the top view of a swing adsorption system 600 having equalization vessels 604a-604e as the structural support members for the adsorbent bed unit. In this diagram, the adsorbent bed unit 602 is supported on cross-members attached to equalization vessels 604a-604e. The equalization vessels are connected to the bottom of the adsorbent bed unit 602 via interconnecting piping 606a-606e, which may include various conduits and valves. Valves and piping required for controlling the flow of various streams through the adsorbent bed unit 602 during a cycle may be included on both the top and the bottom of the adsorbent bed unit, arranged as shown in FIG. 6. With the integration of the equalization vessels into the structural support members for a adsorbent bed unit, the footprint of the adsorbent bed unit can be reduced, resulting in a compact footprint for the swing adsorption system. In this swing adsorption system 600, fluids may pass to and from the adsorbent bed unit 602 from one or more headers (e.g., conduits or piping) via respective conduits, such as conduit 608. Also, the other conduits, such as conduit 610, may be utilized to provide flow passages between different adsorbent bed units and other downstream and upstream equipment (not shown). The use of this swing adsorption system 600 is further explained in FIG. 7.

Figure 7:
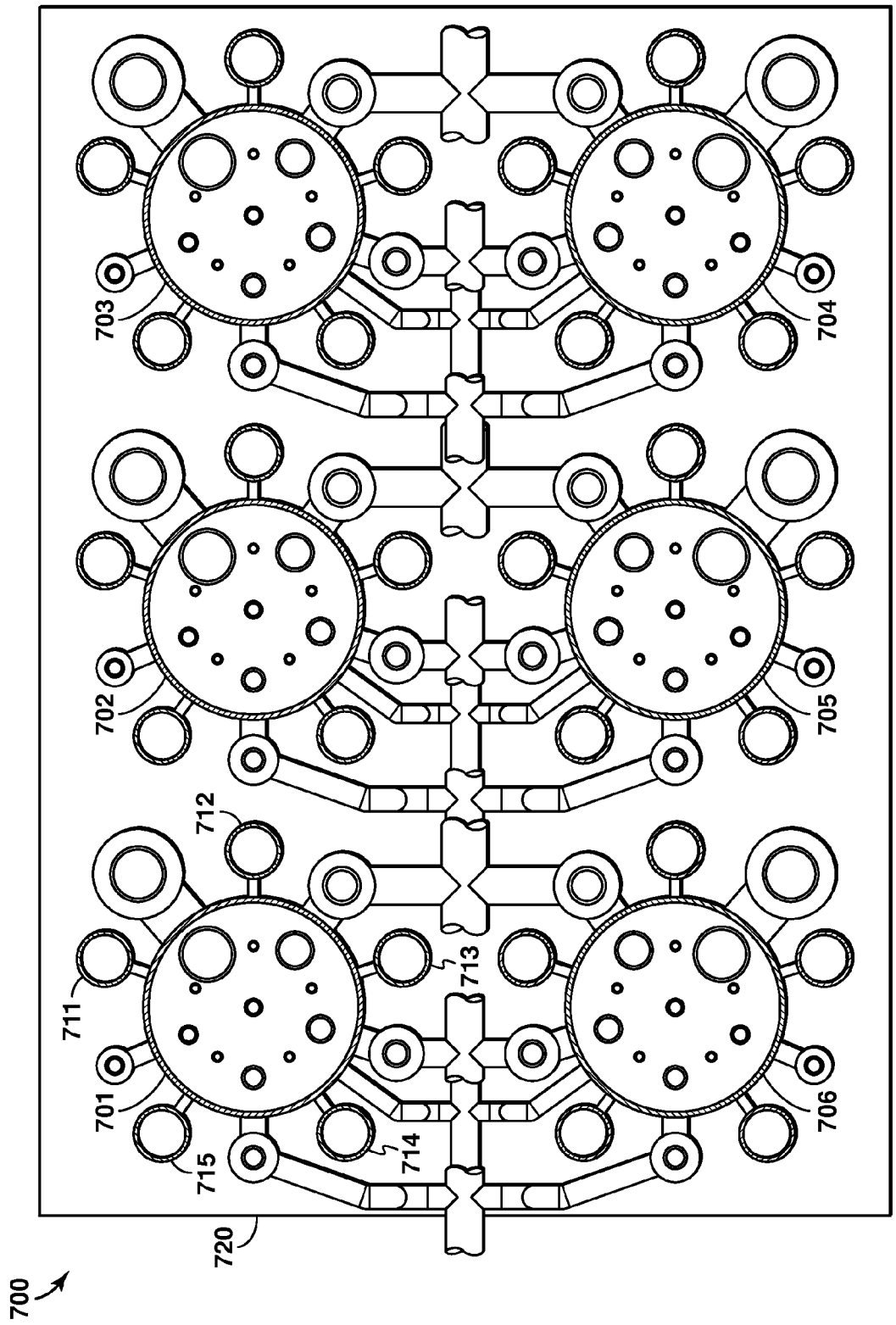
FIG. 7 is a diagram of the top view of a swing adsorption system comprised of six adsorbent bed assemblies, each supported by and including five equalization vessels.

FIG. 7 is a diagram of the top view of a swing adsorption system 700 having six adsorbent bed assemblies 701-706, each of the adsorbent bed assemblies 701-706 is supported by five equalization vessels, respectively. These adsorbent bed assemblies may include one or more of the embodiments of adsorbent bed assemblies noted above. As an example, the equalization vessels 711-715 are shown supporting the adsorbent bed assembly 701, while the other equalization vessels associated with the other adsorbent bed assemblies 702-706 are not labeled for simplicity. Piping from each individual adsorbent bed assembly is connected to one or more common headers that are arranged between the rows of adsorbent bed assemblies. One or more external connections to plant piping are provided on one and/or both ends of the swing adsorption system 700. The entire swing adsorption system can be mounted on a skid or transportable module 720 to facilitate transportation and installation.

Figure 8:
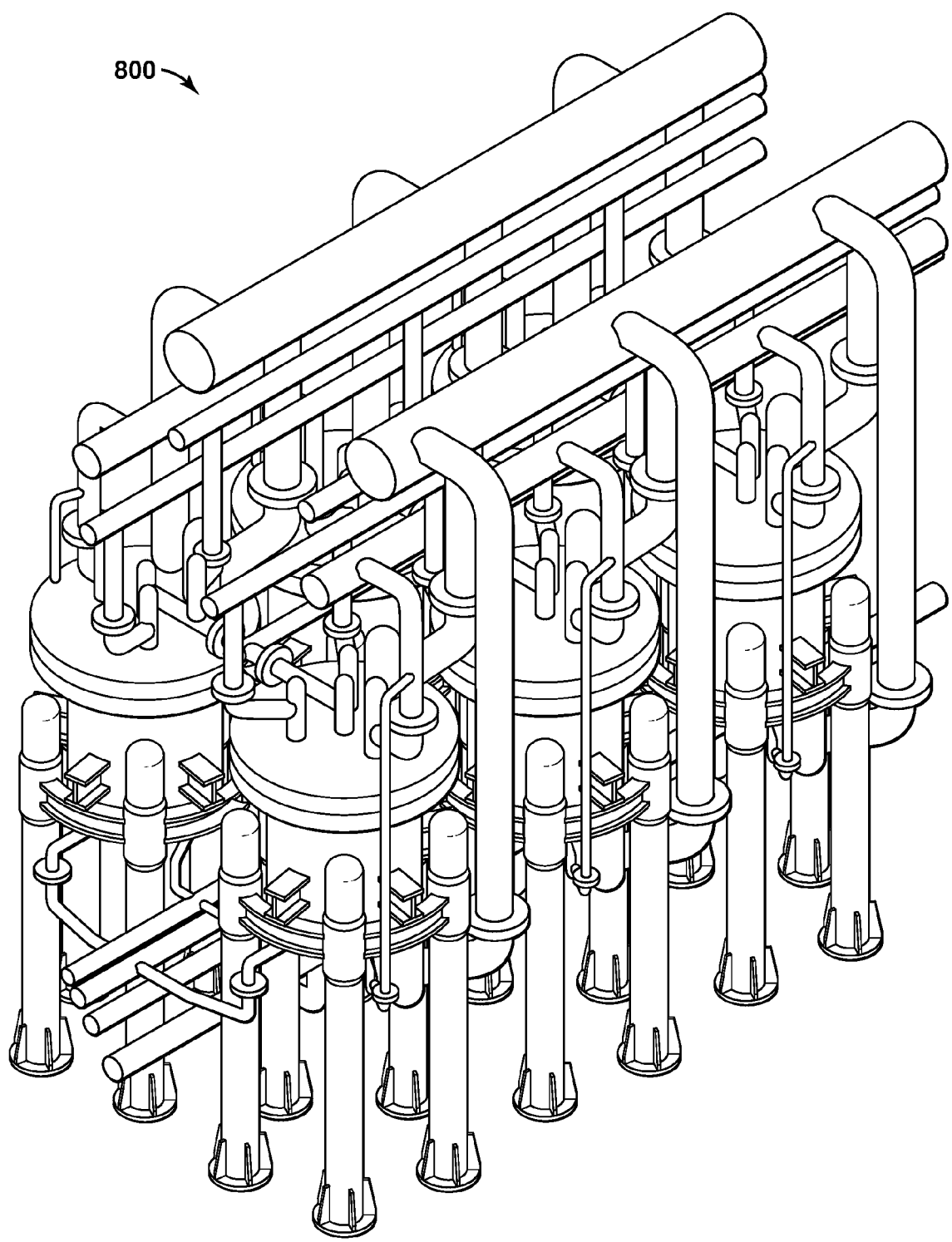
FIG. 8 is a three-dimensional diagram of the swing adsorption system with six adsorbent bed units, five equalization vessels per bed, and interconnecting piping.

FIG. 8 is a three-dimensional diagram 800 of the swing adsorption system 700 of FIG. 7, with six adsorbent bed units, five equalization vessels per bed, and interconnecting piping. This configuration broadly relates to adsorbent bed units that can be deployed in a symmetrical orientation as shown, or non-symmetrical orientation and/or combination of a plurality of hardware skids.

Beneficially, the embodiments of the present techniques may further enhance the operation of swing adsorption systems. For example, a conventional swing adsorption system may be implemented without the use of equalization vessels by performing bed-to-bed equalizations. In such an example, all of the adsorbent beds are interconnected with conduits to exchange gas between the beds. That is, gas from the depressurization step of one adsorbent bed is used for the re-pressurization step of another adsorbent bed. Timing of the cycles for each individual adsorbent bed are synchronized such that the depressurization step of the first adsorbent bed occurs simultaneously with the re-pressurization step of the second adsorbent bed. The additional length of piping or conduit interconnecting the adsorbent beds requires additional time for the equalization steps to occur within the cycle. For a configuration similar to the exemplary embodiment described above, an additional 0.25 seconds is required for each equalization step with bed-to-bed equalization. A cycle in the process for a system with bed-to-bed equalizations may include an adsorption step that has a time interval of 3 seconds, hold step of 0.25 seconds, depressurization step of 0.5 seconds, hold step of 0.25 seconds, depressurization step of 0.5 seconds, hold step of 0.25 seconds, depressurization step of 0.5 seconds, hold step of 0.25 seconds, depressurization step of 0.5 seconds, hold step of 0.25 seconds, depressurization step of 0.5 seconds, hold step of 0.25 seconds, a blowdown step 1.25 seconds, hold step of 0.25 seconds, purge step of 2 seconds, hold step of 0.25 seconds, re-pressurization step of 0.5 seconds, hold step of 0.25 seconds, re-pressurization step of 0.5 seconds, hold step of 0.25 seconds, re-pressurization step of 0.5 seconds, hold step of 0.25 seconds, re-pressurization step of 0.5 seconds, hold step of 0.25 seconds, re-pressurization step of 0.5 seconds, hold step of 0.25 seconds, and the final re-pressurization step with feed gas for 0.5 seconds. The total cycle time requires 15 seconds. However, for the same sequence of steps using the swing adsorption system 700 with the respective equalization vessels, a cycle time interval of 10.3 seconds may be utilized, which reduces the regeneration time associated with the cycle, as described in the previous example. This benefit is further explained in FIG. 9.

Figure 9:
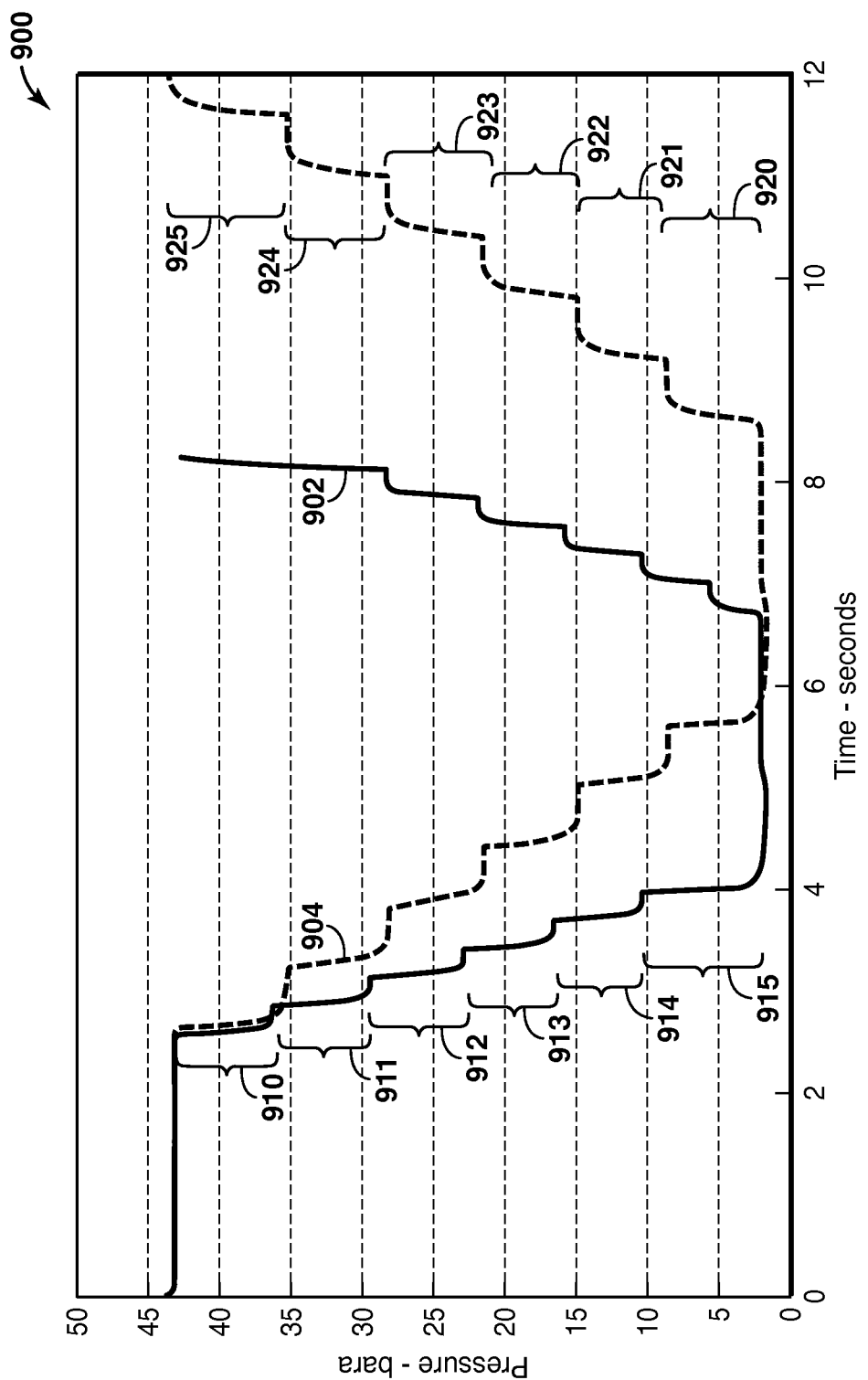
FIG. 9 is a graph of the adsorbent bed pressures versus time during two exemplary cycles, one of which utilizes equalization vessels and the other which utilizes bed-to-bed equalizations.
Figure 10:
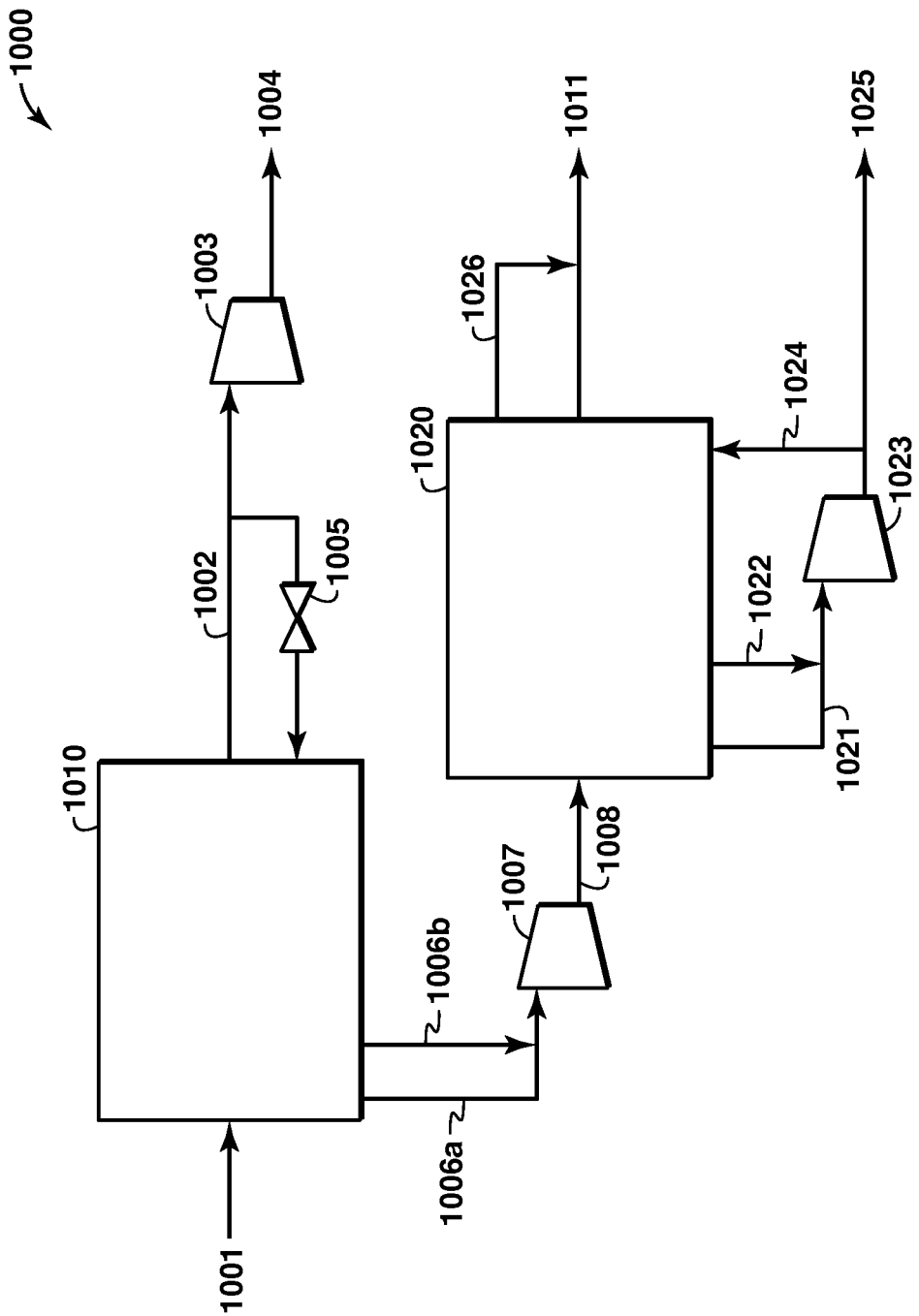
FIG. 10 is a diagram of a system for removing acid gas from feed stream with two RC-PSA systems.

FIG. 9 is a graph 900 of the adsorbent bed pressures versus time during a complete cycle of the process for a system utilizing equalization vessels and a system utilizing bed-to-bed equalization. In this graph 900, the various steps in the process are followed for a response 902 associated with a system having equalization vessels, and a response 904 for a system utilizing bed-to-bed equalization. For both responses 902 and 904, the adsorbent bed undergoes the adsorption step for 3 seconds. During the process cycle of steps (e.g., depressurization and re-pressurization), the entire cycle can be completed within 10.3 seconds for the system utilizing the equalization vessels as shown by response 902. The system involving the bed-to-bed equalizations as shown by response 904 requires 15 seconds to complete the entire cycle. As a result, the amount of time spent on regeneration of the adsorbent bed is 4.7 seconds longer for the response 904 involving bed-to-bed equalizations as compared to the response 902 involving equalization vessels. The result is that additional adsorbent beds are required to provide continuous feed and product flow for the system with bed-to-bed equalizations. Therefore, the size, weight, and cost of the equipment will be higher than the swing adsorption system with equalization vessels.

During the depressurization steps for the pressure ranges 910-914 and blow-down step in pressure range 915, the response 902 performs the steps in a shorter time interval than the response 904. This lessening of the time interval for response 902 is based at least partially on the use of the equalization vessels that are dedicated to the adsorbent bed, while the response 904 utilizes the bed-to-bed transfers of streams in performing the cycle. The benefits of the equalization vessels are also shown for the re-pressurization steps, which has the response 902 involving a shorter time interval as compared to the response 904 for the re-pressurization, as shown by the pressure ranges 920-925.

The swing adsorption system described above can be incorporated into a plant for processing feed streams, such as natural gas. The benefits of equalization vessels can be further illustrated in FIG. 10, which is a diagram of a system 1000 for reducing and/or removing acid gas in a gaseous feed stream via a rapid cycle pressure swing adsorption (RC-PSA) system. Acid gas (e.g., $CO_2$ and $H_2S$) can be removed from a feed stream using a two-step process with RC-PSA system 1000. The RC-PSA system 1000 utilizes a series of RC-PSA systems (e.g., each having one or more adsorbent bed assemblies, as noted above), such as a first RC-PSA system 1010 and second RC-PSA system 1020.

In this system 1000, acid gas is lessened and removed from the feed stream provided via conduit 1001 using the first RC-PSA system 1010 and the purified product containing predominately methane and other hydrocarbons is passed via conduit 1002 through a compressor 1003 and is produced and compressed for sales via conduit 1004. A small portion of the purified product stream is returned through valve 1005 and associated conduit to the RC-PSA system 1010 to provide gas for the purge after the blow-down step to further desorb acid gas from the adsorbent bed. This product purge step cleans the adsorbent bed, which enables the acid gas to be purified to the extent required for a saleable product stream in conduit 1004.

The stream containing acid gas and residual hydrocarbons from the first RC-PSA system 1010 can be passed via conduits 1006a and 1006b (herein referred to as conduit 1006) to a compressor 1007 and second RC-PSA system 1020. The compressed stream may be directed through conduit 1008 to the second RC-PSA system 1020 to remove at least a portion of the acid gas from the hydrocarbons in the stream before it is disposed of as a waste stream. The recovered product from the second RC-PSA system 1020 can be passed via conduit 1011 to other equipment within the process for use as fuel gas, for example, or alternately may be compressed and combined with the product from the first RC-PSA system 1010 for sales.

The removed contaminants removed via the second RC-PSA system 1020 can be passed via conduits 1021 and 1022 for disposal with reduced loss of valuable hydrocarbons. The acid-gas rich stream in conduits 1021 and 1022 may be passed to a compressor 1023 and then at least a portion may be passed to conduit 1025 for disposal.

The second RC-PSA system 1020 utilizes a different series of steps in the cycle as compared to the cycles discussed above. Due to the lower feed pressure to the second RC-PSA system 1020, only two depressurization steps are utilized. Optionally, gas from the each of the two depressurization steps may be directed to dedicated equalization vessels, which may operate similar to the equalization vessels noted above. After the depressurization steps, a portion of the acid gas rich stream may be passed through the second RC-PSA system 1020 to capture hydrocarbon gas remaining in the adsorbent beds during a purge step. The fluid for this purge step may be from any source, such as a portion of the acid gas stream from compressor 1023 via conduit 1024 or it may be from another source (not shown). The gas displaced during the purge step is recycled from the outlet conduit 1026 and combined with the product of the second RC-PSA system 1020 for use in downstream processes or sales.

The RC-PSA systems 1010 and 1020 can be operated with the cycles described above using either bed-to-bed equalizations or equalization vessels. Using the process with the bed-to-bed equalizations, the swing adsorption system may operate to produce the following, as shown in Table 1:

TABLE 1

| Capacity | 70 MSCFD |
|---|---|
| Purity | 98.3% |
| Recovery | 99.4% |
| First PSA | |
| | |
| Number of Beds | 10 |
| Cycle Time | 15 seconds |
| Second PSA | |
| | |
| Number of Beds | 10 |
| Cycle Time | 7.5 seconds |

However, if the method utilizes equalization tanks, the system may operate to produce the following, as shown in Table 2

TABLE 2

| Capacity | 170 MSCFD |
|---|---|
| Purity | 98.3% |
| Recovery | 99.3% |
| First PSA | |
| | |
| Number of Beds | 16 |
| Cycle Time | 10.3 seconds |
| Second PSA | |
| | |
| Number of Beds | 5 |
| Cycle Time | 6.7 seconds |

As noted in Tables 1 and 2, the benefits of using equalization vessels is illustrated by comparing the total number of adsorbent beds to process a given flow rate of natural gas. In particular, to process 1000 MSCFD of natural gas with about 12% acid gas by volume, 286 adsorbent beds are required using bed-to-bed equalizations in the example above. However, using the present invention, 124 adsorbent beds are required using equalization vessels. The increase in productivity is a result of the decrease in regeneration time provided by faster equalization steps. The overall footprint, weight, and cost of the swing adsorption systems are expected to decrease substantially with the reduction in number of adsorbent beds required.

For clarity, recovery is the ratio of the desired gases in the product stream divided by the same desired gases in the gaseous feed stream and product purity is the ratio of the desired gases divided by the other gases in the product stream. In certain embodiments, the product stream has greater than 98 volume percent hydrocarbons based on the total volume of the product stream.

One additional feature of the equalization vessels is the ability to adjust the performance of the swing adsorption system by altering the volume of the equalization vessels. Whereas in bed-to-bed equalizations the volume available for equalizations is simply the free volume and adsorbent vessel not occupied by adsorbent or other internal components, which is fixed by the adsorbent bed design, the volume of the equalization vessels can be adjusted by changing the size of equalization vessels. This feature allows greater flexibility in design of the swing adsorption system. For example, for a given number of equalization steps, increasing the volume of the equalization vessels allows for a larger total pressure drop during depressurization. In an exemplary cycle in which the adsorbent vessel is purged after the depressurization steps, the mass flow of purge gas required is directly proportional to the pressure at which the purge occurs. By using equalization vessels with larger volumes, the purge pressure can be reduced and the overall mass flow rate of purge gas can be reduced. Auxiliary compression associated with the purge gas and recycle of the purge outlet gas can also be reduced as a result, and therefore the power consumption associated with the adsorbent bed unit can be reduced.

Figure 11:
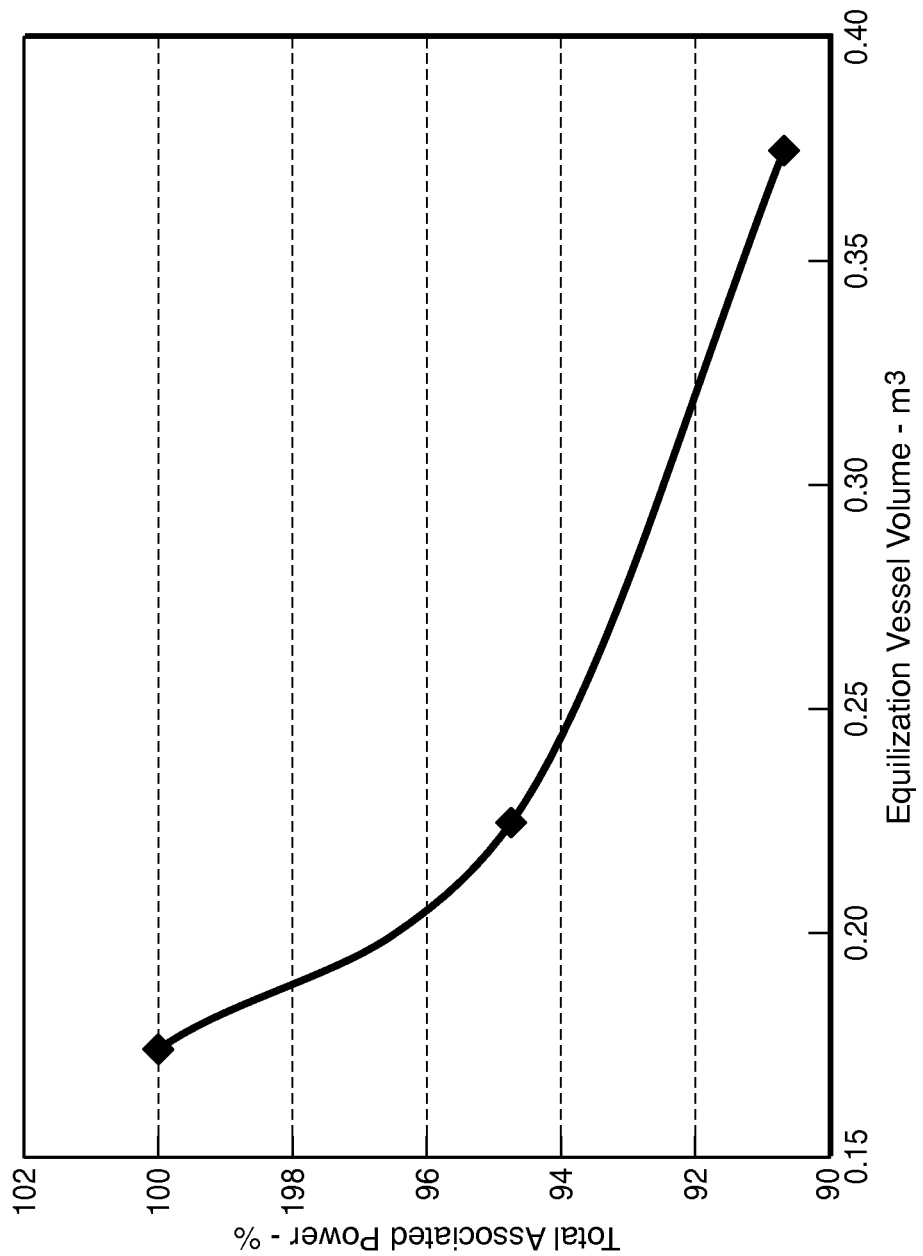
FIG. 11 is a graph of compression power versus equalization tank volume for an exemplary swing adsorption system removing acid gas from natural gas.

FIG. 11 is a graph of compression power versus equalization tank volume for an exemplary swing adsorption system removing about 12% acid gas from natural gas. The overall power can be reduced by as much as 10% by increasing the volume of all equalization vessels in the system from $0.17 m^3$ to $0.38 m^3$. Further improvements could be made by increasing the equalization vessel volumes if there is sufficient space available on the skid or module of the swing adsorption system. Other improvements could be envisioned such as having different sized equalization vessels for different equalization steps or having different sized equalization vessels for different adsorbent beds. Additionally, the volume of the equalization vessels could be adjusted during operation via variable volume tanks such as piston tanks or by having multiple pressure vessels which could be isolated by valves to adjust the total volume available for a given equalization tank.

In addition to the embodiment noted above, one or more embodiments may relates the removal or reduction of contaminants, e.g., $CO_2$, $H_2S$, $N_2$, or heavy ($C_2$+) hydrocarbons, from hydrocarbon containing streams, preferably natural gas streams, using swing adsorption techniques. High hydrocarbon (methane) recovery with high product purity is enabled through a combination of judicious choices of adsorbent material, gas-solid contactor and cycle. When compared to conventional swing adsorbent technology for removing $CO_2$ from natural gas streams, the benefits of the present invention include: lower hydrocarbon losses to $CO_2$, lower overall power consumption, and smaller footprint and equipment weight.

Also, other embodiment may involve swing adsorption processes that utilize a rerun cycle and apparatus and systems related thereto. The rerun cycle provides high product recovery and purity of separated target gases, e.g., acid gas components such as $CO_2$, $H_2S$, etc. Product recovery is preferably greater than 70% of target gas component(s), preferred greater than 80%, or more preferred greater than 90%. Product purity is preferably greater than 80%, or greater than 90%, i.e., no more than no more than 10% of target gas (if $CO_2$) remains in the primary product, preferred no more than 2% (if $CO_2$). If the target gas is $H_2S$, no more than 100 ppm of target gas remains (if $H_2S$), preferred no more than 20 ppm, more preferred no more than 4 ppm. Disposition of all or part of recovered target gas can be fuel or sent to a flare or vent system or injected.

Advantageously the rerun cycle allows a base unit to produce a "on spec" products for direct sale. It also reduces product losses as a result of the blow-down stream from a base unit processed as part of the rerun cycle. Moreover, it achieves product specifications using PSA cycles only.

Further, in other embodiments, as much of the acid gases $H_2S$ and $CO_2$ are removed from natural gas as possible. In some instances the $H_2S$ is removed by a pretreatment step leaving primarily $CO_2$ that needs to be removed. In other instances only $CO_2$ is removed, leaving the $H_2S$ to be removed by downstream processing depending on the intended end use. In all natural gas separations, methane is the valuable component and acts as a light component in swing adsorption processes. Small increases in recovery of this light component can result in significant improvements in process economics and also serve to prevent unwanted resource loss.

Accordingly, in one or more embodiments, the gaseous feed stream is a hydrocarbon containing stream having >20 volume percent hydrocarbons based on the total volume of the gaseous feed stream. This hydrocarbon containing stream may include >2 volume percent $CO_2$ based on the total volume of the gaseous feed stream and an adsorbent material in the adsorbent bed has a higher selectivity to $CO_2$ as compared to hydrocarbons. The product stream may have greater than 98 volume percent hydrocarbons based on the total volume of the product stream.

In other embodiments, the gaseous feed stream is a hydrocarbon containing stream having >20 volume percent $CO_2$ based on the total volume of the gaseous containing stream. The hydrocarbon containing stream has >2 volume percent $N_2$ based on the total volume of the gaseous containing stream and the adsorbent material has a higher selectivity to $N_2$ as compared to hydrocarbons.

In one or more embodiment, the adsorbent material in the bed adsorbent may have less than 30%, less than about 20%, less than about 15%, or less than 10% of its open pore volume in pores with diameters greater than about 20 angstroms and less than about 1 micron.

The volume-tank cycle advantageously breaks bed-to-bed sequence requirements, other than continuous streams to/from compressors. It also allows faster blow-down which shortens cycle time, e.g., such as by about 50% or about 30% or about 20%. In one or more embodiments, bed-to-bed piping is reduced or eliminated and headers may be used for only feed, product, exhaust, and recycle streams. Result is that using equalization tanks instead of bed-to-bed equalizations and for roughly equivalent performance (purities and recoveries) can double feed capacity for a given skid size.

The apparatus, systems, and processes provided above are useful in swing adsorption separation techniques. Non-limiting swing adsorption processes include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

PSA processes rely on the phenomenon of gases being more readily adsorbed within the pore structure or free volume of an adsorbent material when the gas is under pressure, i.e., the higher the gas pressure, the greater the amount readily-adsorbed gas adsorbed. When the pressure is reduced, the adsorbed component is released, or desorbed.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide is selectively adsorbed by the adsorbent, and the gas exiting the vessel is enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures.

The provided processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 vol. % $CO_2$, 4 ppm $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly important as remaining gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

One or more of the following Concepts A-0 may be utilized with the processes, apparatus, and systems, provided above, to prepare a desirable product stream while maintaining high hydrocarbon recovery.

Concept A: using one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PSA) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884 which are each herein incorporated by reference in its entirety;

Concept B: removing acid gas with RC-TSA using advanced cycles and purges as described in U.S. patent application No. 61/447,848, filed Mar. 1, 2011, which is herein incorporated by reference in its entirety;

Concept C: using a mesopore filler to reduce the amount of trapped methane in the adsorbent and increase the overall hydrocarbon recovery, as described in U.S. Patent Application Publication Nos. 2008/0282892, 2008/0282885, 2008/028286, each of which is herein incorporated by reference in its entirety. The non-sweepable void space present within the adsorbent channel wall is can be defined by the total volume occupied by mesopores and macropores. Mesopores are defined by the IUPAC to be pores with sizes in the 20 to 500 angstrom size range. Macropores are defined herein to be pores with sizes greater than 500 angstrom and less than 1 micron. Because the flow channels are larger than 1 micron in size, they are not considered to be part of the macropore volume. The non-sweepable void space is defined herein as the open pore volume occupied by pores in the adsorbent that are between 20 angstroms and 10,000 angstroms (1 micron) in diameter divided by the total volume of the contactor that is occupied by the adsorbent material including associated mesopores and macropores in the adsorbent structure. The non-sweepable void space can be reduced by filling the mesopores and macropores between the particles to reduce the open volume, while allowing rapid gas transport throughout the adsorbent layer. This filling of the non-sweepable void space, which may be referred to as mesopore filling or a mesopore filler, is desired to reduce to acceptable levels the quantity of desired product lost during the rapid desorption step as well as to allow a high degree of adsorbent bed purity following desorption. Such mesopore filling can be accomplished in a variety of ways. For example, a polymer filler can be used with rapid diffusion of $H_2S$ and $CO_2$, such as a silicon rubber or a polymer with intrinsic porosity. Alternatively, a pyrolitic carbon having mesoporosity and/or microporosity could be used to fill the void space. Still another way is by filling the void space with inert solids of smaller sizes, or by filling the void space with a replenishable liquid through which the desired gases rapidly diffuse (such as water, solvents, or oil). Preferably, the void space within the adsorbent wall is reduced to less than about 40 volume percent (vol.%), preferably to less than 30 vol.%, and more preferably to less than 20 vol.%, and even more preferably to less than 10 vol.% and most preferably less than about 5 vol % of the open pore volume;

Concept D: choosing an appropriate adsorbent materials to provide high selectivity and minimize adsorption (and losses) of methane and other hydrocarbons, such as one or more of the zeolites described in U.S. Patent Application Publication Nos. 2008/0282887 and 2009/0211441, each of which is herein incorporated by reference in its entirety. Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, they do not catalyze undesirable reactions with hydrocarbons that would occur on acidic zeolites. Functionalized mesoporous adsorbents are also preferred, wherein their affinity toward hydrocarbons is further reduced compared to un-functionalized smaller pore materials, such as zeolites.

Alternatively, adsorption of heavy hydrocarbons can be kinetically suppressed by using small-pore functionalized materials, in which diffusion of heavy hydrocarbons is slow compared to $H_2S$ and $CO_2$. Care should also be taken to reduce condensation of hydrocarbons with carbon contents equal to or above about 4 (i.e., $C_4+$ hydrocarbons) on external surfaces of $H_2S$ and $CO_2$ selective adsorbents.

Non-limiting example of functional groups suitable for use herein include primary, secondary, tertiary and other non-protogenic, basic groups such as amidines, guanidines and biguanides. Furthermore, these materials can be functionalized with two or more types of functional groups. To obtain substantially complete removal of $H_2S$ and $CO_2$ from natural gas streams, an adsorbent material preferably is selective for $H_2S$ and $CO_2$ but has a low capacity for both methane and heavier hydrocarbons ($C_2+$). In one or more embodiments, it is preferred to use amines, supported on silica based or other supports because they have strong adsorption isotherms for acid gas species. They also have high capacities for such species, and as a consequence of their high heats of adsorption, they have a relatively strong temperature response (i.e. when sufficiently heated they readily desorb $H_2S$ and $CO_2$ and can thus be used without excessive temperature swings). Preferred are adsorbents that adsorb in the 25° C. to 70° C. range and desorb in the 90° C. to 140° C. range. In systems requiring different adsorbents for $CO_2$ and $H_2S$ removal, a layered bed comprising a suitable adsorbent for the targeted species may be desirable.

For $CO_2$ removal from natural gas, it is preferred to formulate the adsorbent with a specific class of 8-ring zeolite materials that has a kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials preferably has a Si/Al ratio from about 1 to about 25. In other preferred embodiments, the Si/Al ratio of the zeolite material is from 2 to about 1000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients for $CO_2$ over methane (i.e., $DCO_2/DCH_4$) is greater than 10, preferably greater than about 50, and more preferably greater than about 100 and even more preferably greater than 200.

In many instances, nitrogen also has to be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$, from natural gas, this specific class of 8-ring zeolite materials also has a Si/Al ratio from about 2 to about 1000, preferably from about 10 to about 500, and more preferably from about 50 to about 300. This preferred class of 8-ring zeolites that are suitable for use herein allow $N_2$ to access the internal pore structure through 8-ring windows in a manner such that the ratio of single component diffusion coefficients for $N_2$ over methane (i.e., $DN_2/DCH_4$) is greater than 5, preferably greater than about 20, and more preferably greater than about 50 and even more preferably greater than 100. Resistance to fouling in swing adsorption processes during the removal $N_2$ from natural gas is another advantage offered by this class of 8-ring zeolite materials.

In a preferred embodiment, $H_2S$ is selectively removed with a non-aqueous sorbent comprising a basic non-protogenic nitrogenous compound supported on a marcroporous, mesoporous, or microporous solid. The non-protogenic nitrogenous compound selectively reacts with at least a portion of the $H_2S$ in the feed gas mixture. Examples of suitable porous solid supports include activated charcoal or solid oxides (including mixed oxides), such as alumina, silica, silica-alumina or acidic or non-acidic zeolites. The basic non-protogenic nitrogenous compound may simply be physically sorbed on the support material (e.g. by impregnation or bonded with or grafted onto it by chemical reaction with the base itself or a precursor or derivative in which a substituent group provides the site for reaction with the support material in order to anchor the sorbent species onto the support). Bonding is not, however, required for an effective solid phase sorbent material. Support materials which contain reactive surface groups, such as the silanol groups found on zeolites and the M41S silica oxides are capable of reacting with siloxane groups in compounds, such as trimethoxysilylpropyldimethylamine Non-protogenic nitrogenous compounds do not enter into chemisorption reactions with $CO_2$ in the absence of water although they do undergo reaction with $H_2S$. This differential chemical reactivity is used to make the separation between the $H_2S$ and the $CO_2$. A wide variety of basic nitrogen-containing compounds may be used as the essential sorbent. If desired, a combination of such compounds may be used. The requirement for the desired selectivity for $H_2S$ adsorption is that the nitrogenous groups be non-protogenic, that is, incapable of acting as a proton donor. The nitrogenous groups therefore do not contain an acidic, dissociable hydrogen atom, such as nitrogen in a primary or secondary amine. It is not required that the whole compound be aprotic, only that the nitrogen-containing groups in the compound be non-protogenic. Non-protogenic nitrogen species cannot donate an $H^+$ (proton), which is a prerequisite for the formation of carbamates as a route for the $CO_2$ chemisorption reaction in the absence of water; they are non-nucleophilic under the prevailing reaction conditions. Suitable nitrogenous compounds include tertiary amines such as triethylamine, triethanolamine (TEA), methyldiethanolamine (MDEA), N-methyl diethanolamine ($CH_3N(C_2H_4OH)_2$), NNN'N'-tetrakis(2-hydroxyethyl)ethylenediamine as well as non-protogenic nitrogenous bases with cyclic, multicyclic, and acyclic structures, such as imines, heterocyclic imines and amines, amidines(carboxamidines) such as dimethylamidine, guanidines, triazabicyclodecenes, imidazolines, and pyrimidines. Compounds such as the N,N-di(lower alkyl)carboxamidines where lower alkyl is preferably $C_1$-$C_6$ alkyl, N-methyltetrahydropyrimidine (MTHP), 1,8-diazabicyclo[5.4.0]-undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C\!=\!\!N\!-\!\!R^5$ where $R^1$, $R^2$, $R^3$ and $R^4$ are preferably lower alkyl ($C_1$-$C_6$) and $R^5$ is preferably H or lower alkyl ($C_1$-$C_6$), such as 1,1,3,3-tetramethylguanidine and biguanide, may also be used. Other substituent groups on these compounds such as higher alkyl, cycloalkyl, aryl, alkenyl, and substituted alkyl and other structures may also be used.

Another class of materials that is capable of removing $H_2S$ and $CO_2$, from natural gas streams is cationic zeolites. Selectivity of these materials for $H_2S$ and $CO_2$ depends on the framework structure, choice of cation, and the Si/Al ratio. In a preferred embodiment the Si/Al ratio for cationic materials is in a range from 1 to 50 and more preferably a range from 1 to 10. Examples of cationic zeolite include zeolites, 4A, 5A and faujasites (Y and X). It is preferred to use these materials for selectively removing $H_2S$ and $CO_2$ after the feed stream has been dehydrated.

Other non-limiting examples of preferred selective adsorbent materials for use in embodiments herein include microporous materials such as zeolites, AlPOs, SAPOs, MOFs (metal organic frameworks), ZIFs (zeolitic imidazolate frameworks, such as ZIF-7, ZIF-8, ZIF-22, etc.) and carbons, as well as mesoporous materials such as the amine functionalized MCM materials. For the acidic gases such as hydrogen sulfide and carbon dioxide which are typically found in natural gas streams, adsorbent such as cationic zeolites, amine-functionalized mesoporous materials, stannosilicates, carbons are also preferred;

Concept E: depressurizing one or more RC-PSA units in multiple steps to intermediate pressures so that the acid gas exhaust can be captured at a higher average pressure, thereby decreasing the compression required for acid gas injection. Pressure levels for the intermediate depressurization steps may be matched to the interstage pressures of the acid gas compressor(s) to optimize the overall compression system;

Concept F: using exhaust or recycle streams to minimize processing and hydrocarbon losses, such as using exhaust streams from one or more RC-PSA units as fuel gas instead of re-injecting or venting;

Concept G: using multiple adsorbent materials in a single bed to remove trace amounts of a first contaminant, such as $H_2S$, before removal of a second contaminant, such as $CO_2$; such segmented beds may provide rigorous acid gas removal down to ppm levels with RC-PSA units with minimal purge flow rates;

Concept H: using feed compression before one or more RC-PSA units to achieve a desired product purity;

Concept I: contemporaneous removal of non-acid gas contaminants such as mercaptans, COS, and BTEX; selection processes and materials to accomplish the same;

Concept J: using structured adsorbents for gas-solid contactors to minimize pressure drop compared to conventional packed beds;

Concept K: selecting a cycle time and cycle steps based on adsorbent material kinetics;

Concept L: using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler;

Concept M: using parallel channel contactors, wherein gas/solid contacting takes place in relatively small diameter adsorbent-lined channels. This structure of the contactor provides the benefits of rapid adsorption kinetics through minimization of gas film resistance and high gas-solid communication. A preferred adsorber design generates a sharp adsorption front.

It is preferred to have very rapid gas to adsorbent kinetics, i.e. the length through which the target species (e.g., target gas) diffuses to make contact with the adsorbent wall is kept short, preferably less than 1000 microns, more preferably less than 200 microns, and most preferably less than 100 microns. Favorable adsorbent kinetics may be realized by, while limiting bed pressure drop to acceptable values, utilizing parallel channel contactors wherein the feed and purge gases are confined to a plurality of very narrow (1000 to 30 micron diameter) open channels that are lined to an effective thickness of the adsorbent material.

By "effective thicknesses" we mean a range of about 500 microns to 5 microns for most applications. In the most limiting case of laminar gas flow, the very narrow channels limit the maximum diffusion distance for a trace species to no more than half the diameter of the channel. Even when adsorbing the desired species at the leading edge of the adsorption front, where their concentrations approach zero in the gas phase, a sharp adsorption front can be maintained by using such small diameter parallel channel structured adsorbent bed configurations. Such a configuration can be in the form of multiple independent parallel channels, or in the form of very wide, very short channels as may be achieved by using a spiral wound design;

Concept N: a means for rapidly heating and cooling the adsorbent bed structure so that adsorption can occur at a lower temperature and desorption at a higher temperature. The adsorption step then occurs at high pressure and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme.

By "internal temperature control" we mean the use of a heating and cooling fluid media, either gaseous or liquid, preferably liquid, that can be circulated through the same adsorbent lined channels that are utilized for the gaseous feed flow. Internal temperature control requires that the adsorbent material not be adversely affected by the temperature control fluid and that the temperature control fluid be easily separated from the previously adsorbed species ($H_2S$ and $CO_2$) following the heating step. Further, for internal temperature control, the pressure drop across each of the parallel channels in the structured bed during the gaseous feed adsorption step is preferably sufficiently high to clear each channel (or the single channel in the case of spiral wound designs) of the temperature control fluid. Additionally, internal fluid flow temperature designs preferably utilize an adsorbent that does not strongly adsorb the temperature control fluid so that $H_2S$ and $CO_2$ may be usefully adsorbed even in the presence of the temperature control fluid.

Non-limiting examples of such adsorbents include amine functionalized microporous and mesoporous adsorbents. A non-limiting example of such a system would be the use of supported amines on a water stable support with the use of hot and cold water (pressurized liquid or used as steam for heating) for heating and cooling. Whereas liquid water may be left within the adsorbent wall during the adsorption step, if the thickness of the adsorbent wall is kept small (less than 1000 microns, preferably less than 200 microns, and most preferably less than 100 microns) it may be possible for $H_2S$ and $CO_2$ to diffuse through the liquid water in time scales less than 1 minute, more preferred less than 10 seconds to become adsorbed by the supported amine Following the desorption step, $H_2S$ and $CO_2$ can be easily separated using distillation or other methods known to those skilled in the art.

By "external temperature control" we mean an adsorbent bed structure where the heating and cooling fluid is kept from contact with the gas-carrying adsorbent channels. Such a structure can resemble a tube and shell heat exchanger, plate and frame heat exchanger or hollow fibers with a fluid impermeable barrier layer on the outer diameter or on the inner diameter, or any other suitable structures. In order to obtain rapid heating and cooling, the distance through which the heat diffuses from the temperature control fluid to the adsorbent layer should be kept to a minimum, ideally less than 10,000 microns, more preferably less than 1000 microns, most preferably less than 200 microns.

A non-limiting example of such an external temperature control bed design would be the use of hollow fibers with a fluid impermeable barrier layer on the outer diameter wherein the hollow fibers are comprised of a mixed matrix system of polymeric and supported amine adsorbents. Feed gas would be passed through the inner diameter of the porous fiber to be adsorbed by the adsorbent at lower temperatures, while cool temperature control fluid is flowing over the fibers outer diameters. Desorption would be accomplished by passing hot temperature control fluid, preferably in a counter-current direction over the fibers outer diameter, thus heating the adsorbent. The cycle is completed by exchanging the hot temperature control fluid with cold fluid to return the fiber containing the adsorbent to the desired adsorption temperature.

In a preferred embodiment, the rate of heat flow in the system would be such that a sharp temperature gradient in the temperature control fluid would be established during heating and cooling such that the sensible heat of the system can be recuperated within the adsorbent bed structure. For such a non-limiting hollow fiber example, the useful fiber outer diameter dimension is less than 20,000 microns, preferably less than 2000 microns, and most preferably less than 1000 microns. The useful hollow fiber inner diameters (the feed gas channels) is less than 10,000 microns, preferably less than 1000 microns, and most preferably less than 500 microns as suitable based on the desired adsorption and desorption cycle times, feed adsorbed species concentrations, and adsorbent layer swing capacity for those species.

In some embodiments, it is advantageous to keep the ratio of non-adsorbing thermal mass in the adsorbent bed to adsorbent as low as possible. This ratio is preferably be less than 20, more preferably less than 10, and most preferred less than 5. In this manner, the sensible heat of the system that is swung in each cycle may be kept to a minimum;

Concept O: A relatively low flow of about 0.01 to 5 vol. % of the total feed of a clean gas substantially free of $H_2S$ or $CO_2$ is utilized as a purge gas. Non-limiting examples of such gases (i.e., "clean gas") include methane and nitrogen that are maintained flowing through the parallel channels in a direction counter-current to the feed direction during at least a portion of the desorption steps of the process. It is preferred that the flow rate of this clean gas be sufficient to overcome the natural diffusion of the desorbing $H_2S$ and $CO_2$ to maintain the product end of the adsorbing channel in a substantially clean condition. That is, the purge stream should have sufficient flow rate to sweep the desorbing $CO_2$ and $H_2S$ from the channels and/or pores. It is this counter-current purge flow during desorption that ensures that on each subsequent adsorption cycle there is no breakthrough of target species, such as $H_2S$ or $CO_2$ into the product stream. A further benefit or objective of the clean purge is to assist in desorption of contaminants by reducing the partial pressure of contaminants in the flow channels of the adsorbent bed. This lessening of the partial pressure may be utilized to drive the contaminants from the adsorbent bed.

A preferred cycle and bed design for the practice of the present invention is that the product end of the adsorbent channels (i.e. the end opposite the end where feed gases enter) have a low, or ideally essentially zero concentration of adsorbed $H_2S$ and $CO_2$. In this manner, and with suitable structured channels as described above, the $H_2S$ and $CO_2$ are rigorously removed from the feed gas stream. The downstream end of the bed can be kept clean as described by maintaining a low flow of a clean fluid substantially free of $H_2S$ and $CO_2$, in a counter-current direction relative to the feed direction, during the desorption step(s), or more preferably, during all the heating and cooling steps in the cycle. It is further preferred that during the adsorption step, the adsorption part of the cycle be limited to a time such that the advancing adsorption front of $H_2S$ and $CO_2$ loaded adsorbent not reach the end of the channels, i.e. adsorption to be halted prior to $H_2S$ and/or $CO_2$ breakthrough so that a substantially clean section of the adsorbent channel remains substantially free of target species. With reasonably sharp adsorption fronts, this allows more than 50 vol. % of the adsorbent to be utilized, more preferred more than 75 vol. %, and most preferred more than 85 vol. %.

The processes, apparatus, and systems provided herein are useful in large gas treating facilities, such as facilities that process more than five million standard cubic feet per day (MSCFD) of natural gas, or more than 15 MSCFD of natural gas, or more than 25 MSCFD of natural gas, or more than 50 MSCFD of natural gas, or more than 100 MSCFD of natural gas, or more than 500 MSCFD of natural gas, or more than one billion standard cubic feet per day (BSCFD) of natural gas, or more than two BSCFD of natural gas.

Compared to conventional technology, the provided processes, apparatus, and systems require lower capital investment, lower operating cost, and less physical space, thereby enabling implementation offshore and in remote locations, such as Arctic environments. The provided processes, apparatus, and systems provide the foregoing benefits while providing high hydrocarbon recovery as compared to conventional technology.

Additional embodiments 1-28 are provided in the following paragraphs:

1. A cyclical swing adsorption process for removing contaminants from gas feed streams comprising the steps of:
   a) passing a gaseous feed stream at a feed pressure through an adsorbent bed unit having an adsorbent bed to separate one or more contaminants from the gaseous feed stream to form a product stream;
   b) interrupting the flow of the gaseous feed stream;
   c) performing a plurality of depressurization steps, wherein each depressurization step comprises passing a portion of the gas from the adsorbent bed unit into one or more equalization vessels that are dedicated to the adsorbent bed unit and the depressurization step to reduce the pressure within the adsorbent bed unit;
   d) performing a plurality of re-pressurization steps, wherein each re-pressurization step comprises passing the portion of the gas from one or more equalization vessels associated with one of the plurality of depressurization steps to the adsorbent bed unit to increase the pressure within the adsorbent bed unit; and
   e) repeating the steps a) to d) for at least one additional cycle.
2. The cyclical swing adsorption process of paragraph 1, further comprising a step of purging the adsorbent bed unit after the plurality of depressurization steps and before the plurality of equalization steps.
3. The cyclical swing adsorption process of any of the paragraphs 1 to 2, further comprising one or more blow-down steps to reduce the pressure in the adsorbent bed unit after the plurality of depressurization steps and before the plurality of equalization steps.
4. The cyclical swing adsorption process of any of the paragraphs 1 to 3, wherein the ratio of the pressure within the adsorbent bed unit at one depressurization step divided by the pressure within the adsorbent bed unit at a subsequent depressurization step is less than about 0.98.
5. The cyclical swing adsorption process of any of the paragraphs 1 to 4, wherein the ratio of the pressure within the adsorbent bed adsorbent bed unit at one re-pressurization step divided by the pressure within the adsorbent bed adsorbent bed unit at a previous re-pressurization step is less than about 0.98.
6. The cyclical swing adsorption process of any of the paragraphs 1 to 5, wherein the gaseous feed stream is a hydrocarbon containing stream having >20 volume percent hydrocarbons based on the total volume of the gaseous feed stream.
7. The cyclical swing adsorption process of paragraph 6, wherein the hydrocarbon containing stream has >2 volume percent $CO_2$ based on the total volume of the gaseous feed stream and an adsorbent material in the adsorbent bed has a higher selectivity to $CO_2$ as compared to hydrocarbons.
8. The cyclical swing adsorption process of any of the paragraphs 5 to 6, wherein the product stream has greater than 98 volume percent hydrocarbons based on the total volume of the product stream.
9. The cyclical swing adsorption process of any of the paragraphs 1 to 5, wherein the gaseous feed stream is a hydrocarbon containing stream having >20 volume percent $CO_2$ based on the total volume of the gaseous containing stream.
10. The cyclical swing adsorption process of paragraph 9, wherein the hydrocarbon containing stream has >2 volume percent $N_2$ based on the total volume of the gaseous containing stream and the adsorbent material has a higher selectivity to $N_2$ as compared to hydrocarbons.
11. The cyclical swing adsorption process of any of the paragraphs 1 to 8, wherein the one or more contaminants being adsorbed comprise $CO_2$ or $H_2S$.
12. The cyclical swing adsorption process of any of the paragraphs 1 to 11, wherein the cycle of steps a) through d) is performed in a time interval less than about 60 seconds.
13. The cyclical swing adsorption process of any of the paragraphs 1 to 11, wherein the cycle of steps a) through d) is performed in a time interval less than about 20 seconds.
14. The cyclical swing adsorption process of any of the paragraphs 1 to 11, further comprising passing the gaseous feed stream to a manifold that distributes the gaseous feed steam to one of a plurality of the adsorbent bed adsorbent bed unit, wherein each of the adsorbent bed adsorbent bed units operate cycles independently of each other.
15. The cyclical swing adsorption process of any of the paragraphs 1 to 14, wherein the steps a) to d) are steps in the cycle of one or more of a pressure swing adsorption process, thermal swing adsorption process, calcination, partial pressure swing or displacement purge adsorption process and combinations of these processes.
16. The cyclical swing adsorption process of any of the paragraphs 1 to 8, wherein the gaseous feed stream comprises one or more contaminants of $H_2S$ in a range from about 0.001 volume percent to about 70 volume percent based on the total volume of the gaseous feed stream.
17. The cyclical swing adsorption process of any of the paragraphs 1 to 16, wherein an adsorbent material in adsorbent bed adsorbent bed has less than about 20% of its open pore volume in pores with diameters greater than about 20 angstroms and less than about 1 micron.
18. The cyclical swing adsorption process of any of the paragraphs 1 to 17, further comprising recapturing pressure from at least one of the equalization vessels after the equalization vessel has be utilized in the one of the plurality of equalization steps.
19. A adsorbent bed assembly comprising:
    a housing having an interior region and configured to maintain a pressure from 0 bar a to 80 a bar within the interior region;
    an adsorbent bed disposed in the interior region and having a plurality of flow channels through the adsorbent bed, wherein the plurality of flow channels have an adsorbent material disposed on at least one surface within the plurality of flow channels;
    an inlet conduit disposed adjacent to the adsorbent bed and configured to pass a stream into the interior region from a location external to the housing;
    an outlet conduit disposed adjacent to the adsorbent bed and configured to pass a stream into the interior region from a location external to the housing; and
    a plurality of equalization vessels in fluid communication with the interior region and dedicated to the adsorbent bed.
20. The adsorbent bed assembly of paragraph 19, wherein at least one of the plurality of equalization vessels is configured to support the housing and adsorbent bed.
21. The adsorbent bed assembly of any one of paragraphs 19 to 20, wherein each of the plurality of equalization vessels has a pressure reset valve and is configured to exchange fluids with a conduit in a first position and to prevent fluid flow to the conduit in a second position.

22. The adsorbent bed assembly of any one of paragraphs 19 to 21, wherein each of the plurality of equalization vessels is configured to exchange fluids with the housing during one of a plurality of re-pressurization steps and one of a plurality of depressurization steps in each cycle and configured to prevent fluid flow in other re-pressurization steps and other depressurization steps in each cycle.

23. The adsorbent bed assembly of paragraph 19, wherein the adsorbent material in the adsorbent bed has less than about 20% of its open pore volume in pores with diameters greater than about 20 angstroms and less than about 1 micron.

24. A swing adsorption system comprising:
a plurality of adsorbent bed assemblies, wherein each adsorbent bed assembly comprises:
a housing having an interior region and configured to maintain a pressure from 0 bar a to 80 bar a within the interior region;
an adsorbent bed disposed in the interior region and having a plurality of flow channels through the adsorbent bed, wherein the plurality of flow channels have an adsorbent material disposed on at least one surface within the plurality of flow channels;
an inlet conduit disposed adjacent to the adsorbent bed and configured to pass a stream into the interior region from a location external to the housing;
an outlet conduit disposed adjacent to the adsorbent bed and configured to pass a stream into the interior region from a location external to the housing; and
a plurality of equalization vessels in fluid communication with the interior region and dedicated to the adsorbent bed.

25. The swing adsorption system of paragraph 24, wherein at least one of the plurality of equalization vessels for at least one of each adsorbent bed assembly is configured to support the housing and adsorbent bed.

26. The swing adsorption system of any one of paragraphs 24 to 25, wherein each of the plurality of equalization vessels has a pressure reset valve and is configured to exchange fluids with a conduit in a first position and to prevent fluid flow to the conduit in a second position.

27. The swing adsorption system of any one of paragraphs 24 to 26, wherein at least one of the plurality of adsorbent bed assemblies has each of the plurality of equalization vessels configured to exchange fluids with the housing during one of a plurality of re-pressurization steps and one of a plurality of depressurization steps in each cycle and configured to prevent fluid flow in other re-pressurization steps and other depressurization steps in each cycle.

28. The swing adsorption system of any one of paragraphs 24 to 27, wherein the adsorbent material in the adsorbent bed has less than about 20% of its open pore volume in pores with diameters greater than about 20 angstroms and less than about 1 micron.

29. The swing adsorption system of any one of paragraphs 24 to 28, wherein each of the plurality of adsorbent bed assemblies is configured to independently utilize the plurality of equalization vessels associated with that adsorbent bed assembly.

In view of the many possible embodiments to which the principles of the disclosed invention may be applied, it should be recognized that the illustrative embodiments are only preferred examples of the invention and should not be taken as limiting the scope of the invention.

What is claimed is:

1. A cyclical swing adsorption process for removing contaminants from gas feed streams comprising the steps of:
a) passing a gaseous feed stream at a feed pressure through a adsorbent bed unit having an adsorbent bed to separate one or more contaminants from the gaseous feed stream to form a product stream;
b) interrupting the flow of the gaseous feed stream;
c) performing a plurality of depressurization steps, wherein each depressurization step comprises passing a portion of the gas from the adsorbent bed unit into one or more equalization vessels that are dedicated to the adsorbent bed unit and the depressurization step to reduce the pressure within the adsorbent bed unit;
d) performing a plurality of re-pressurization steps, wherein each re-pressurization step comprises passing the portion of the gas from one or more equalization vessels associated with one of the plurality of depressurization steps to the adsorbent bed unit to increase the pressure within the adsorbent bed unit; and
e) repeating the steps a) to d) for at least one additional cycle.

2. The cyclical swing adsorption process of claim 1, further comprising a step of purging the adsorbent bed unit after the plurality of depressurization steps and before the plurality of re-pressurization steps.

3. The cyclical swing adsorption process of claim 1, further comprising one or more blow-down steps to reduce the pressure in the adsorbent bed unit after the plurality of depressurization steps and before the plurality of re-pressurization steps.

4. The cyclical swing adsorption process of claim 1, wherein the ratio of the pressure within the adsorbent bed unit at one depressurization step divided by the pressure within the adsorbent bed unit at a subsequent depressurization step is less than about 0.98.

5. The cyclical swing adsorption process of claim 1, wherein the ratio of the pressure within the adsorbent bed unit at one re-pressurization step divided by the pressure within the adsorbent bed unit at a previous re-pressurization step is less than about 0.98.

6. The cyclical swing adsorption process of claim 1, wherein the gaseous feed stream is a hydrocarbon containing stream having >20 volume percent hydrocarbons based on the total volume of the gaseous feed stream.

7. The cyclical swing adsorption process of claim 6, wherein the hydrocarbon containing stream has >2 volume percent $CO_2$ based on the total volume of the gaseous feed stream and an adsorbent material in the adsorbent bed has a higher selectivity to $CO_2$ as compared to hydrocarbons.

8. The cyclical swing adsorption process of claim 5, wherein the product stream has greater than 98 volume percent hydrocarbons based on the total volume of the product stream.

9. The cyclical swing adsorption process of claim 1, wherein the gaseous feed stream is a hydrocarbon containing stream having >20 volume percent $CO_2$ based on the total volume of the gaseous containing stream.

10. The cyclical swing adsorption process of claim 9, wherein the hydrocarbon containing stream has >2 volume percent $N_2$ based on the total volume of the gaseous containing stream and the adsorbent material has a higher selectivity to $N_2$ as compared to hydrocarbons.

11. The cyclical swing adsorption process of claim 1, wherein the one or more contaminants being adsorbed comprise $CO_2$ or $H_2S$.

12. The cyclical swing adsorption process of claim 1, wherein the cycle of steps a) through d) is performed in a time interval less than about 60 seconds.

13. The cyclical swing adsorption process of claim 1, wherein the cycle of steps a) through d) is performed in a time interval less than about 20 seconds.

14. The cyclical swing adsorption process of claim 1, further comprising passing the gaseous feed stream to a manifold that distributes the gaseous feed steam to one of a plurality of the adsorbent bed unit, wherein each of the adsorbent bed units operate cycles independently of each other.

15. The cyclical swing adsorption process of claim 1, wherein the steps a) to d) are steps in the cycle of one or more of a pressure swing adsorption process, thermal swing adsorption process, calcination, partial pressure swing or displacement purge adsorption process and combinations of these processes.

16. The cyclical swing adsorption process of claim 1, wherein the gaseous feed stream comprises one or more contaminants of $H_2S$ in a range from about 0.001 volume percent to about 70 volume percent based on the total volume of the gaseous feed stream.

17. The cyclical swing adsorption process of claim 1, wherein an adsorbent material in adsorbent bed has less than about 20% of its open pore volume in pores with diameters greater than about 20 angstroms and less than about 1 micron.

18. The cyclical swing adsorption process of claim 1, further comprising recapturing pressure from at least one of the equalization vessels after the equalization vessel has be utilized in the one of the plurality of re-pressurization steps.

19. A adsorbent bed assembly comprising:
a housing having an interior region and configured to maintain a pressure from 0 bar to 80 bar within the interior region;
an adsorbent bed disposed in the interior region and having a plurality of flow channels through the adsorbent bed, wherein the plurality of flow channels have an adsorbent material disposed on at least one surface within the plurality of flow channels;
an inlet conduit disposed adjacent to the adsorbent bed and configured to pass a stream into the interior region from a location external to the housing;
an outlet conduit disposed adjacent to the adsorbent bed and configured to pass a stream into the interior region from a location external to the housing; and
a plurality of equalization vessels in fluid communication with the interior region and dedicated to the adsorbent bed.

20. The adsorbent bed assembly of claim 19, wherein at least one of the plurality of equalization vessels is configured to support the housing and adsorbent bed.

21. The adsorbent bed assembly of claim 19, wherein each of the plurality of equalization vessels has a pressure reset valve and is configured to exchange fluids with a conduit in a first position and to prevent fluid flow to the conduit in a second position.

22. The adsorbent bed assembly of claim 19, wherein each of the plurality of equalization vessels is configured to exchange fluids with the housing during one of a plurality of re-pressurization steps and one of a plurality of depressurization steps in each cycle and configured to prevent fluid flow in other re-pressurization steps and other depressurization steps in each cycle.

23. The adsorbent bed assembly of claim 19, wherein the adsorbent material in the adsorbent bed has less than about 20% of its open pore volume in pores with diameters greater than about 20 angstroms and less than about 1 micron.

24. A swing adsorption system comprising:
a plurality of adsorbent bed assemblies, wherein each adsorbent bed assembly comprises:
a housing having an interior region and configured to maintain a pressure from 0 bar a to 80 bar a within the interior region;
an adsorbent bed disposed in the interior region and having a plurality of flow channels through the adsorbent bed, wherein the plurality of flow channels have an adsorbent material disposed on at least one surface within the plurality of flow channels;
a inlet conduit disposed adjacent to the adsorbent bed and configured to pass a stream into the interior region from a location external to the housing;
an outlet conduit disposed adjacent to the adsorbent bed and configured to pass a stream into the interior region from a location external to the housing; and
a plurality of equalization vessels in fluid communication with the interior region and dedicated to the adsorbent bed.

25. The swing adsorption system of claim 24, wherein at least one of the plurality of equalization vessels for at least one of each adsorbent bed assembly is configured to support the housing and adsorbent bed.

26. The swing adsorption system of claim 24, wherein each of the plurality of equalization vessels has a pressure reset valve and is configured to exchange fluids with a conduit in a first position and to prevent fluid flow to the conduit in a second position.

27. The swing adsorption system of claim 24, wherein at least one of the plurality of adsorbent bed assemblies has each of the plurality of equalization vessels configured to exchange fluids with the housing during one of a plurality of re-pressurization steps and one of a plurality of depressurization steps in each cycle and configured to prevent fluid flow in other re-pressurization steps and other depressurization steps in each cycle.

28. The swing adsorption system of claim 24, wherein the adsorbent material in the adsorbent bed has less than about 20% of its open pore volume in pores with diameters greater than about 20 angstroms and less than about 1 micron.

29. The swing adsorption system of claim 24, wherein each of the plurality of adsorbent bed assemblies is configured to independently utilize the plurality of equalization vessels associated with that adsorbent bed assembly.

* * * * *